US012420548B2

(12) United States Patent
Iwano

(10) Patent No.: US 12,420,548 B2
(45) Date of Patent: Sep. 23, 2025

(54) LIQUID EJECTION HEAD AND LIQUID EJECTION APPARATUS

(71) Applicant: CANON KABUSHIKI KAISHA, Tokyo (JP)

(72) Inventor: Takuya Iwano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 18/128,003

(22) Filed: Mar. 29, 2023

(65) Prior Publication Data

US 2023/0311502 A1 Oct. 5, 2023

(30) Foreign Application Priority Data

Mar. 30, 2022 (JP) ................................ 2022-056255

(51) Int. Cl.
*B41J 2/14* (2006.01)

(52) U.S. Cl.
CPC .. *B41J 2/14233* (2013.01); *B41J 2002/14306* (2013.01)

(58) Field of Classification Search
CPC .................. B41J 2/14233; B41J 2002/14306; B41J 2/14; B41J 2/21; B41J 2/161; B41J 2/1623; B41J 2002/14362; B41J 2002/14491; B41J 2202/19
See application file for complete search history.

(56) References Cited

U.S. PATENT DOCUMENTS

| | | | | |
|---|---|---|---|---|
| 9,248,650 | B2 | 2/2016 | Muraoka et al. | |
| 9,586,402 | B2 | 3/2017 | Komatsu et al. | |
| 9,855,751 | B2 | 1/2018 | Sakai et al. | |
| 10,882,317 | B2 | 1/2021 | Naito et al. | |
| 2010/0245480 | A1* | 9/2010 | Suzuki | B41J 2/155 347/50 |
| 2015/0052752 | A1 | 2/2015 | Sakai et al. | |
| 2015/0273826 | A1 | 10/2015 | Komatsu et al. | |
| 2017/0341398 | A1 | 11/2017 | Tamenaga et al. | |
| 2018/0015724 | A1 | 1/2018 | Naito et al. | |

FOREIGN PATENT DOCUMENTS

| | | | |
|---|---|---|---|
| CN | 104943384 | A | 9/2015 |
| CN | 109228662 | A | 1/2019 |
| JP | 2015-039795 | A | 3/2015 |

OTHER PUBLICATIONS

Extended European Search Report dated Aug. 9, 2023, in European Patent Application No. 23163625.9.
U.S. Appl. No. 18/128,016, filed Mar. 29, 2023, Tsuji Amma Okushima Iwano.
Office Action dated Jul. 18, 2025, in Chinese Patent Application No. 202310301921.0.

* cited by examiner

*Primary Examiner* — Lisa Solomon
(74) *Attorney, Agent, or Firm* — Venable LLP

(57) ABSTRACT

A technology capable of suppressing misalignment of the arrangement position of an ejection substrate even if a flow path member thermally expands is provided. A module equipped with a substrate that ejects a liquid and a flow path that is fluidly connected to the substrate is inserted and engaged with a frame that supports a support member for supporting the substrate so that the frame and the flow path face each other via a space in a direction intersecting an inserting direction. Further, the module abuts on the frame in the inserting direction in a case of being inserted and engaged with the frame, so as to be supported.

15 Claims, 17 Drawing Sheets

LIQUID EJECTION HEAD AND LIQUID EJECTION APPARATUS

BACKGROUND OF THE INVENTION

Field of the Invention

The present invention relates to a liquid ejection head that can be widely applied as a print head or the like capable of ejecting ink in an inkjet system, for example, and to a liquid ejection apparatus equipped with the liquid ejection head.

Description of the Related Art

Japanese Patent Application Laid-Open No. 2015-039795 discloses a technology in which a print head for ejecting ink in an inkjet system is configured by adjoining an ejection module, which includes an ejection substrate equipped with an ejection port that ejects ink and a pressure generation chamber communicating with the ejection port, to a flow path member, which supplies the ink to the ejection substrate.

In the print head according to the technology disclosed in Japanese Patent Application Laid-Open No. 2015-039795, it is necessary to arrange the ejection substrate with high accuracy in order to form high-resolution images. However, in such a print head, the ejection module and the flow path member are integrally configured using an adhesive agent. For this reason, for example, in a case where the ink is adjusted to a high temperature and then ejected, the temperature of the ink flow path member is raised by the temperature of the ink and the flow path member thermally expands, and thus there is a risk that the position of the ejection substrate, which is arranged with high accuracy, may be misaligned.

SUMMARY OF THE INVENTION

The present invention has been made in view of the above-described problems, so as to provide a technology capable of suppressing misalignment of the arrangement position of an ejection substrate even if a flow path member that supplies ink to the ejection substrate thermally expands.

In the first aspect of the present invention, there is provided a liquid ejection head including:

- a module equipped with a substrate capable of ejecting a liquid by driving an ejection energy generation element and a flow path that is fluidly connected to the substrate;
- a support member configured to support the substrate; and
- a frame configured to support the module and the support member and support the support member at an insertion surface of the module that is inserted and engaged,
- wherein, if the module is inserted and engaged with the frame, the frame and the flow path face each other via a space in a direction intersecting an inserting direction of the module and abut on each other in the inserting direction so as to be supported.

In the second aspect of the present invention, there is provided a liquid ejection apparatus including

- a liquid ejection head including: a module equipped with a substrate capable of ejecting a liquid by driving an ejection energy generation element and a flow path that is fluidly connected to the substrate: a support member configured to support the substrate; and a frame configured to support the module and the support member and support the support member at an insertion surface of the module that is inserted and engaged, wherein, if the module is inserted and engaged with the frame, the frame and the flow path face each other via a space in a direction intersecting an inserting direction of the module and abut on each other in the inserting direction so as to be supported.

According to the present invention, even if a flow path member that supplies ink to an ejection substrate thermally expands, misalignment of the arrangement position of an ejection substrate can be suppressed.

Further features of the present invention will become apparent from the following description of exemplary embodiments with reference to the attached drawings.

DESCRIPTION OF THE EMBODIMENTS

Hereinafter, an example of embodiments of a liquid ejection head and a liquid ejection apparatus is explained in detail with reference to the accompanying drawings. Note that the following embodiments are not intended to limit the present invention, and every combination of the characteristics explained in the present embodiments is not necessarily essential to the solution in the present invention. Further, the positions, shapes, etc., of the constituent elements described in the embodiments are merely examples and are not intended to limit this invention to the range of the examples.

First Embodiment

First, with reference to FIG. 1 to FIG. 11, an explanation is given of a liquid ejection head according to the first embodiment. In the present embodiment, an inkjet print head (hereinafter simply referred to as a "print head") capable of performing printing on an object by driving a piezoelectric element to eject ink is taken as an example of the liquid ejection head for the explanation. Note that the ejection energy generation element is not limited to a piezoelectric element, and it is also possible to use an electrothermal conversion element (heater element). In this case, ink is ejected by bubbles generated by the heater element. Further, the system of ejecting liquid is not limited to the above-described systems, and various publicly-known systems can be used.

<Printing Apparatus>

Figure 1:
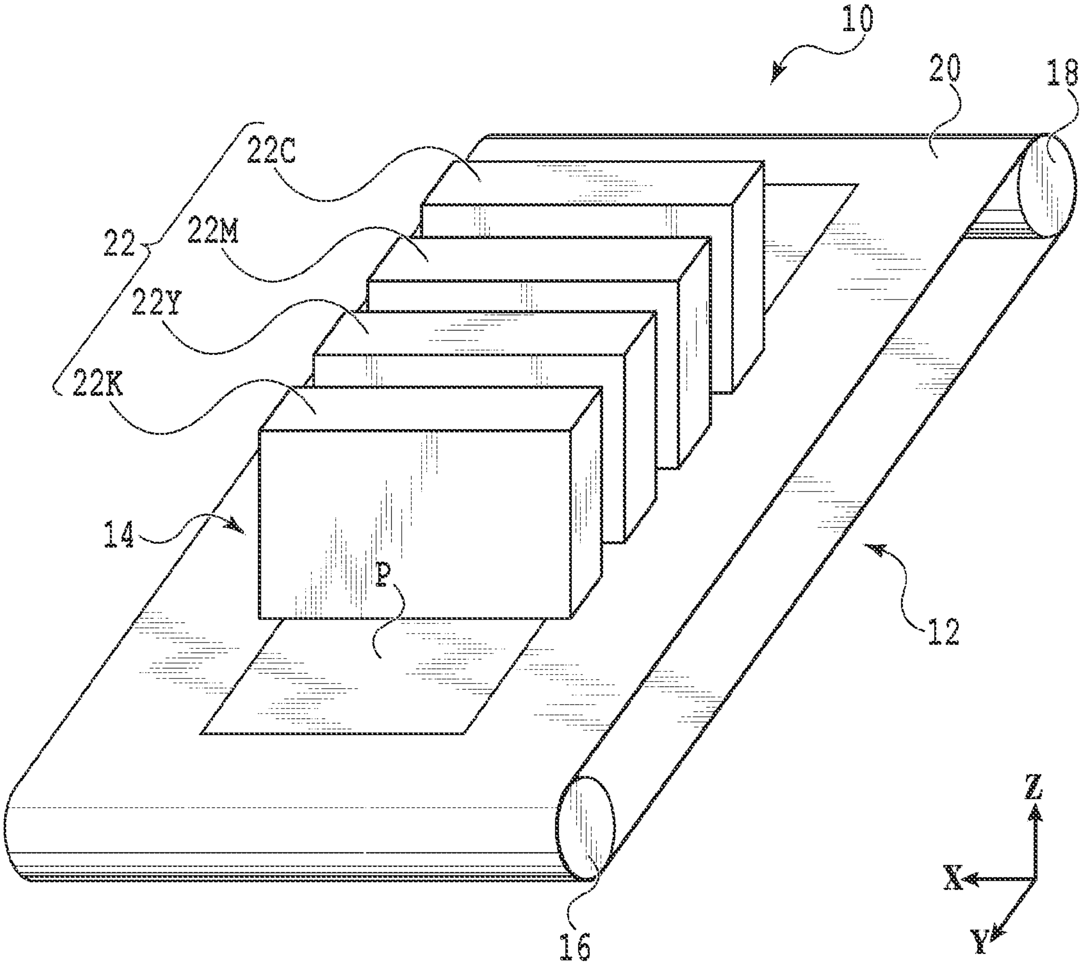
FIG. 1 is a schematic configuration diagram of a printing apparatus.

FIG. 1 is a schematic configuration diagram of a printing apparatus equipped with print heads, which are liquid ejection heads according to the present embodiment. The printing apparatus 10 illustrated in FIG. 1 is a printing apparatus that performs printing on the print medium P by ejecting ink from the print heads in an inkjet system. Note that the liquid ejected from the print heads is not limited to ink, and it is also possible to use a treatment liquid that performs a predetermined process on the ink ejected onto the print medium P.

The printing apparatus 10 is equipped with the conveyance part 12, which conveys the print medium P in the +Y direction, and the printing part 14, which performs printing by ejecting ink onto the print medium P conveyed by the conveyance part 12. The conveyance part 12 includes the belt 20 stretched endlessly around the two rollers 16 and 18. The roller 16 is a driving roller that is driven by the driving of a driving motor, and the roller 18 is a follower roller that pivotally moves by the driving force of the roller 16 transmitted via the belt 20.

The printing part 14 is equipped with the print heads 22 whose surfaces that eject ink face the print medium P which is conveyed by the conveyance part 12. In the present embodiment, the printing part 14 includes the print heads 22 that eject ink of different colors, respectively. Specifically, the print head 22C that ejects cyan (C) ink, the print head 22M that ejects magenta (M) ink, the print head 22Y that ejects yellow (Y) ink, and the print head 22K that ejects black (K) ink are included. In the printing apparatus 10, the array of respective print heads 22 is arranged along the +Y direction in the order of print head 22C, print head 22M, print head 22Y, and print head 22K.

In the respective print heads 22, arrays of multiple ejection ports for ejecting ink are arranged in the X direction which intersects (perpendicularly in the present embodiment) the Y direction. The length in the X direction of an ejection port array formed by arranging an array of multiple ejection ports in the print heads 22 corresponds to the length in the width direction (X direction) of the largest print medium P that can be printed by the printing apparatus 10. The respective print heads 22 are connected to ink tanks (not illustrated in the drawings) that store the corresponding inks and are configured so that the inks circulate between the ink tanks and the print heads 22. Note that various publicly-known technologies can be used for the configuration of circulating the inks between the ink tanks and the print heads 22, and thus a detailed explanation thereof is omitted.

Although the present embodiment is configured so that the inks circulate between the ink tanks and the print heads 22, there is not a limitation as such. For example, there may be such a form in which, without circulating the inks, two tanks are installed with a print head interposed therebetween, so that the ink in the print head 22 is made to flow by flowing the ink from one tank to the other tank. Further, in the printing apparatus 10, at the timing where the printing start position on the print medium P is positioned below the print head 22C, the C ink is ejected under the control of a control part (not illustrated in the drawings) which controls the printing apparatus 10. Thereafter, the print medium P is conveyed, and ink is ejected from the print head 22M, print head 22Y, and print head 22K in the same manner, so as to thereby perform printing on the print medium P. That is, in the present embodiment, the printing apparatus 10 performs printing on a print medium by conveying the print medium once in the +Y direction. The configuration of the printing apparatus 10 is not limited to such a full-line type configuration as described above and may be a serial scan type configuration or a flatbed type configuration.

<Configuration of the Print Heads>

Figure 2B:
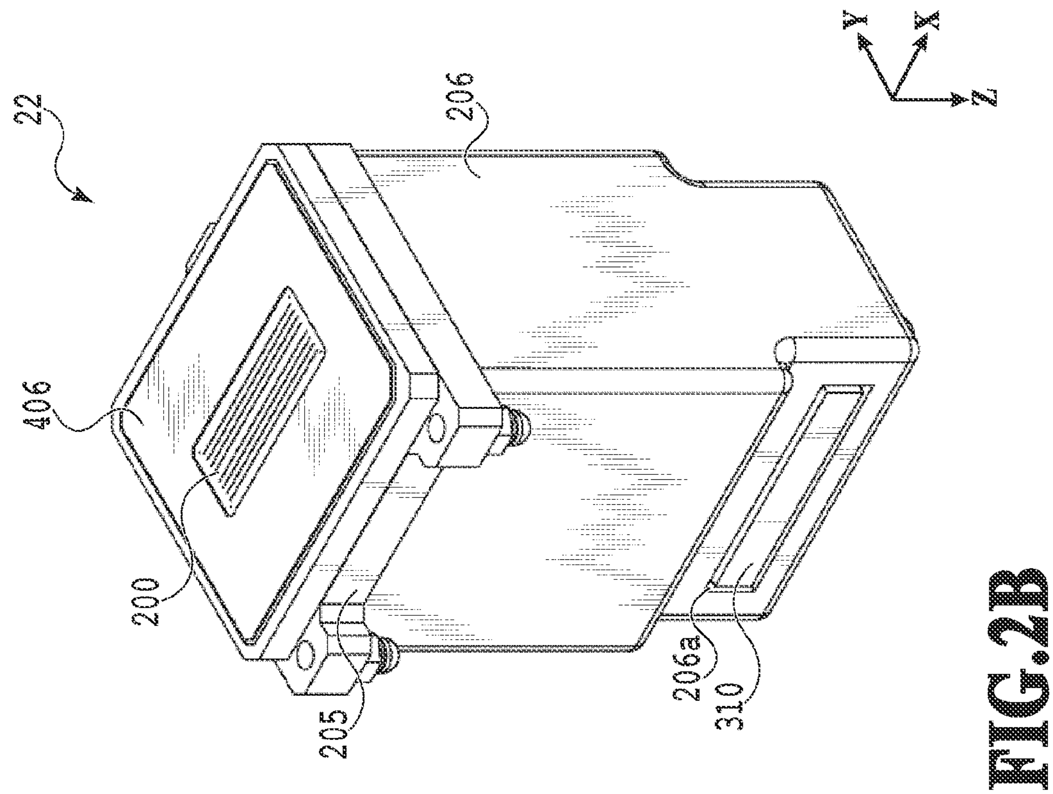
FIG. 2A and FIG. 2B are perspective configuration diagrams of a print head.
Figure 2A:
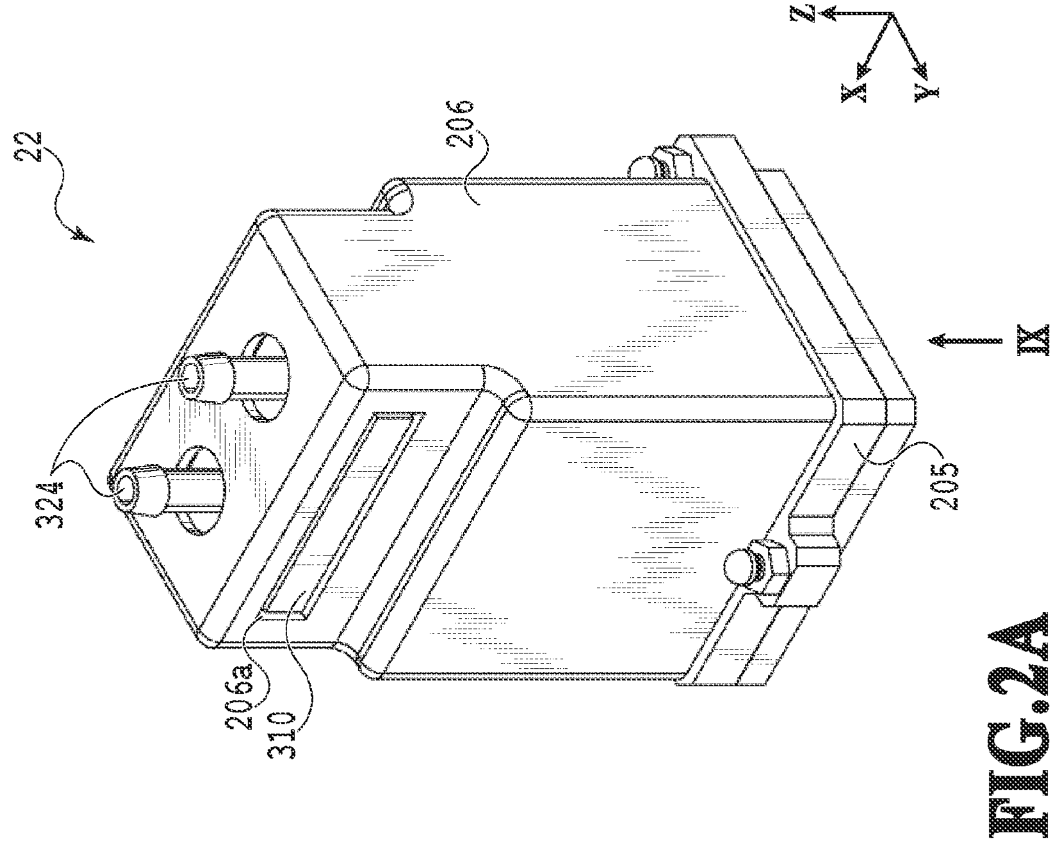
Figure 3B:
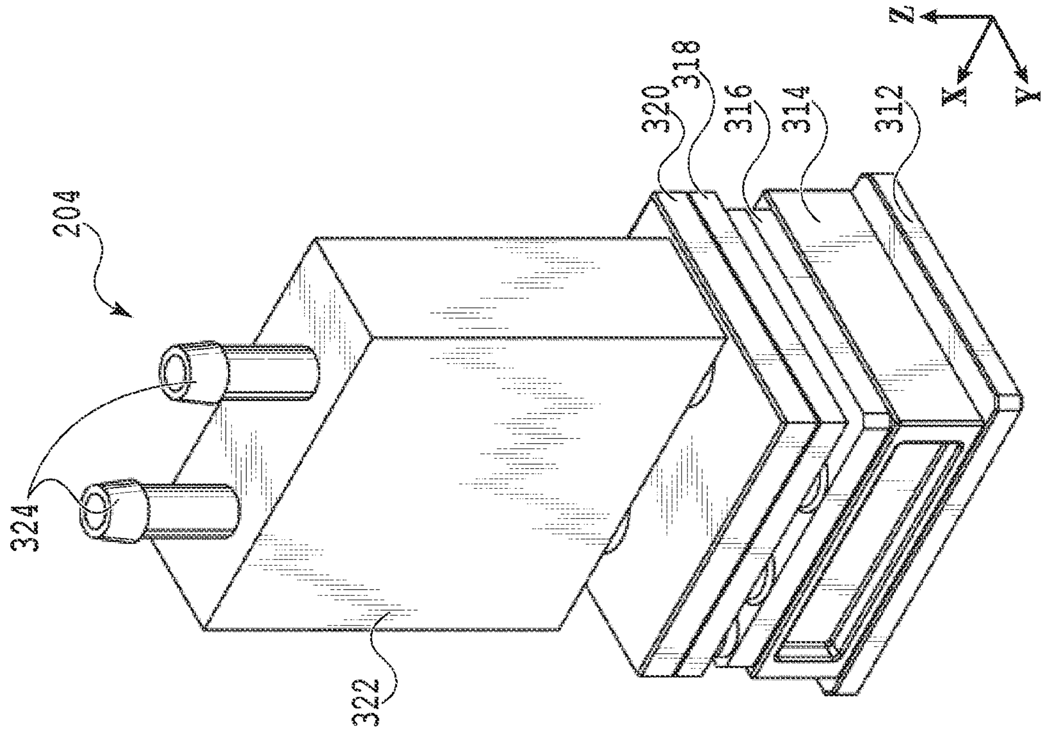
FIG. 3A and FIG. 3B are perspective configuration diagrams of a substrate part and a flow path part.
Figure 3A:
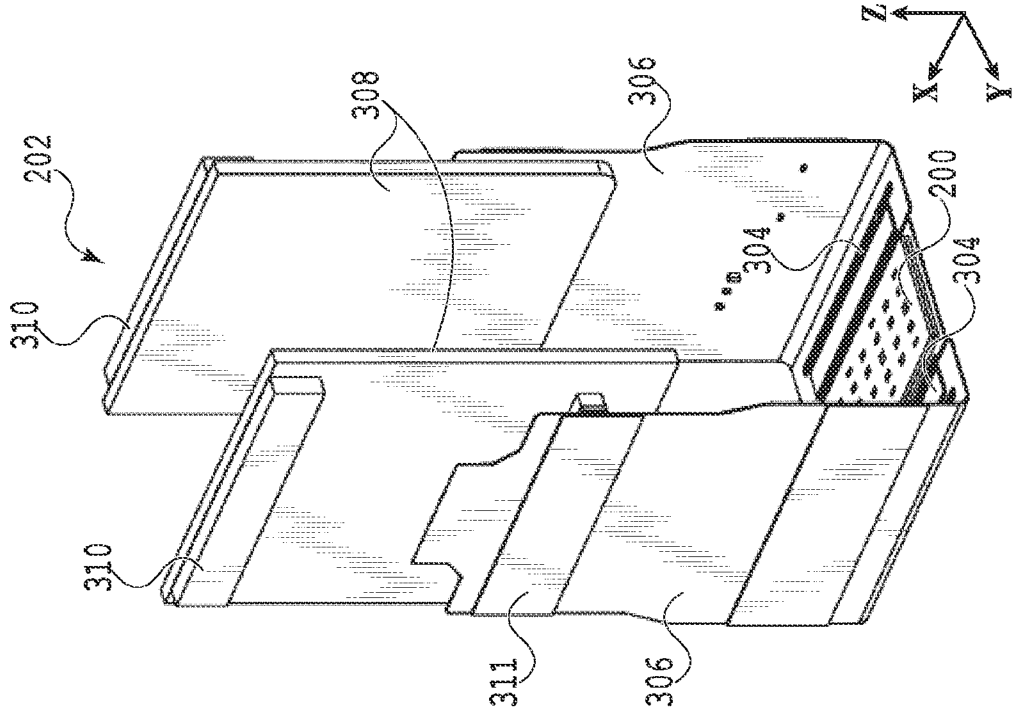
Figure 4:
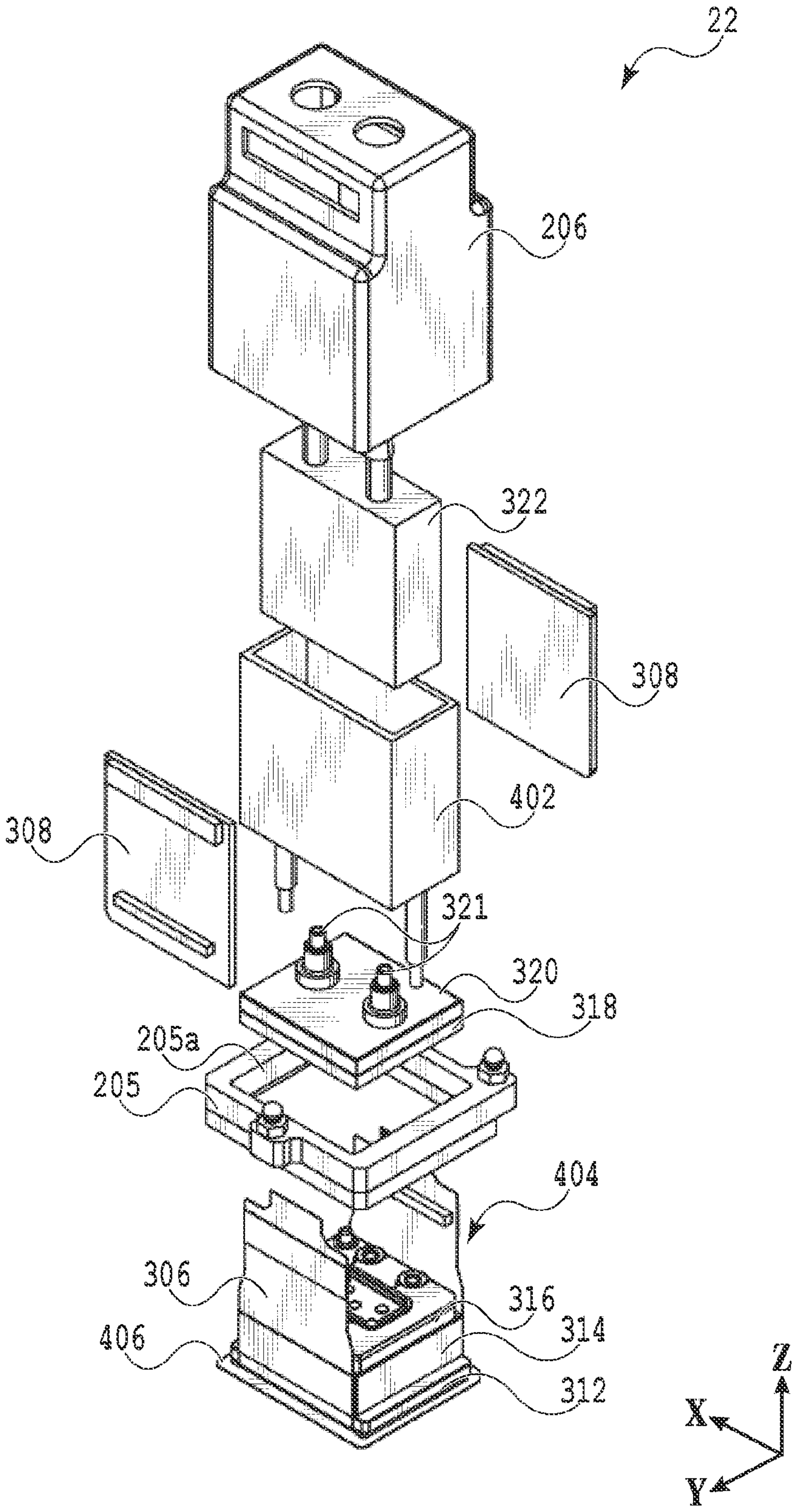
FIG. 4 is an exploded diagram of the print bead.

Next, an explanation is given of the configuration of print heads mounted on the printing apparatus 10. FIG. 2A and FIG. 2B are perspective configuration diagrams of a print head. FIG. 2A is a diagram viewed from the downstream side in the +Z direction, and FIG. 2B is a diagram viewed from the upstream side in the +Z direction. FIG. 3A and FIG. 3B are perspective configuration diagrams of a substrate part and a flow path part accommodated inside the print head of FIG. 2A and FIG. 2B. FIG. 3A is the substrate part, and FIG. 3B is the flow path part. FIG. 4 is an exploded diagram of the print head.

The print head 22 is equipped with the substrate part 202, which includes the print element substrate 200 capable of ejecting ink, and the flow path part 204, in which a flow path for supplying and collecting ink to and from the print element substrate 200 is formed (see FIG. 3A and FIG. 3B). Note that, in the present embodiment, an explanation is given of the case in which the print head 22 is equipped with one print element substrate 200. In the print head 22, the substrate part 202 and the flow path part 204 are connected to each other and are accommodated in the cover member 206 in a state of being supported by the support member 205 (hereinafter also referred to as a "frame"). Here, the flow path connection parts 324 (which are described later) for connecting to external flow paths are in the state of protruding from the upper side of the print head 22 (see FIG. 2A). Further, on the lower surface of the print head 22, the print element substrate 200 is exposed in the state of being supported by the print element substrate support member 406 (which is described later) (see FIG. 2B).

The substrate part 202 is equipped with the print element substrate 200, the drive circuit substrates 304, the flexible wiring substrates 306, and the electrical wiring substrates 308. The print element substrate 200 is electrically connected via the drive circuit substrates 304, the flexible wiring substrates 306, and the electrical wiring substrates 308 to a control part (not illustrated in the drawings) that controls the entire printing apparatus. Note that the print element substrate 200 corresponds to the ejection substrate described in the related art section. That is, the print element substrate 200 is equipped with ejection ports and pressure generation chambers communicating with the ejection ports, and, in the pressure generation chambers, pressure is generated by driving print elements (ejection energy generation elements), so that ink is ejected from the ejection ports by the pressure. As the print elements, for example, various publicly-known elements such as electrothermal conversion elements and piezo elements can be used.

The electrical wiring substrates 308 are equipped with the electrical connection terminals 310. Further, the electrical wiring substrates 308 are connected to the flexible wiring substrates 306 via the electrical connection parts 311 installed on the flexible wiring substrates 306. Regarding the two side surfaces parallel to the XZ plane in the cover member 206, the openings 206*a* are installed at the upper parts thereof. Further, if the substrate part 202 and the flow path part 204 are accommodated in the cover member 206, the electrical connection terminals 310 are exposed to the outside through the openings 206*a* (see FIG. 2A and FIG. 2B). The wiring connected to the control part of the printing apparatus 10 is connected to the electrical connection terminals 310. Accordingly, ejection drive signals output from the control part and the electric power necessary for ejection are input from the electrical connection terminals 310 and supplied to the print element substrate 200 via the electrical wiring substrates 308, the flexible wiring substrates 306, and the drive circuit substrates 304.

With the wiring consolidated by the electric circuit on the electrical wiring substrates 308, the number of terminals in the electrical connection terminals 310 can be reduced compared to the number of terminals in the print element substrate 200. Accordingly, it is possible to reduce the number of electrical connection parts that need to be removed at the time of replacing the print head 22 in the printing apparatus 10. Further, the print element substrate 200 and parts of the flexible wiring substrates 306 are supported by the print element substrate support member 406. If the substrate part 202 and the flow path part 204 are accommodated in the cover member 206, the print element substrate support member 406 is supported by the support member 205 and thereby forms the lower surface of the print head 22. The print element substrate support member 406 is supported so that the print element substrate 200 is exposed from the bottom surface of the print head 22.

The flow path part 204 is equipped with the first flow path member 312, the second flow path member 314, and the third flow path member 316. The first flow path member 312 is connected to the second flow path member 314 so that fluid can flow in the flow path formed therein, that is, fluidly connected. The second flow path member 314 is fluidly connected to the third flow path member 316. Note that, if the substrate part 202 and the flow path part 204 are connected to each other, the first flow path member 312 is fluidly connected to the print element substrate 200.

Further, the flow path part 204 is equipped with the fourth flow path member 318, the fifth flow path member 320, and the liquid supply unit 322. The third flow path member 316 and the fourth flow path member 318 are connected to each other as a flow path, and the fourth flow path member 318 and the fifth flow path member 320 are fluidly connected to each other. The fifth flow path member 320 is connected to the liquid supply unit 322 via the connection part 321 (see FIG. 4).

In the liquid supply unit 322, the flow path connection parts 324 are installed on the upper surface thereof. Further, a filter (not illustrated in the drawings) for removing foreign substances in the flowing ink is installed inside the liquid supply unit 322 so as to communicate with the respective openings of the flow path connection parts 324. The flow path connection parts 324 are connected to the ink supply system of the printing apparatus 10. Specifically, the ink supply system is connected to one of the two flow path connection parts 324 installed in the liquid supply unit 322 so that ink is supplied into the liquid supply unit 322, and the ink supply system is also connected to the other one of them so that ink is collected from the liquid supply unit 322.

As described above, the flow path of the flow path part 204 is fluidly connected to the flow path of the print element substrate 200. Therefore, the present embodiment is configured so that the ink circulates in the ink flow path system, which includes the flow path of the printing apparatus 10 and the flow path of the print head 22. The liquid supplied to the liquid supply unit 322 passes through the fifth flow path member 320, the fourth flow path member 318, the third flow path member 316, the second flow path member 314, and the first flow path member 312 to be supplied to the print element substrate 200. Further, the ink that is supplied to the print element substrate 200 but is not ejected passes through the first flow path member 312, the second flow path member 314, the third flow path member 316, the fourth flow path member 318, and the fifth flow path member 320 to be collected from the print element substrate 200 to the liquid supply unit 322.

In the print head 22, the electrical wiring substrate support part 402 is installed so as to surround the outer periphery of the liquid supply unit 322. If the substrate part 202 and the flow path part 204 are connected to each other, the electrical wiring substrates 308 are supported by the electrical wiring substrate support part 402. In the present embodiment, it is assumed that a part of the substrate part 202 and a part of the flow path part 204 form the ejection module 404 (see FIG. 4). The configuration of the substrate part 202 that configures the ejection module 404 includes the flexible wiring substrates 306, the drive circuit substrates 304, and the print element substrate 200. Further, the configuration of the flow path part 204 that configures the ejection module 404 includes the first flow path member 312, the second flow path member 314, and the third flow path member 316.

<Configuration of the Ejection Module>

Figure 5B:
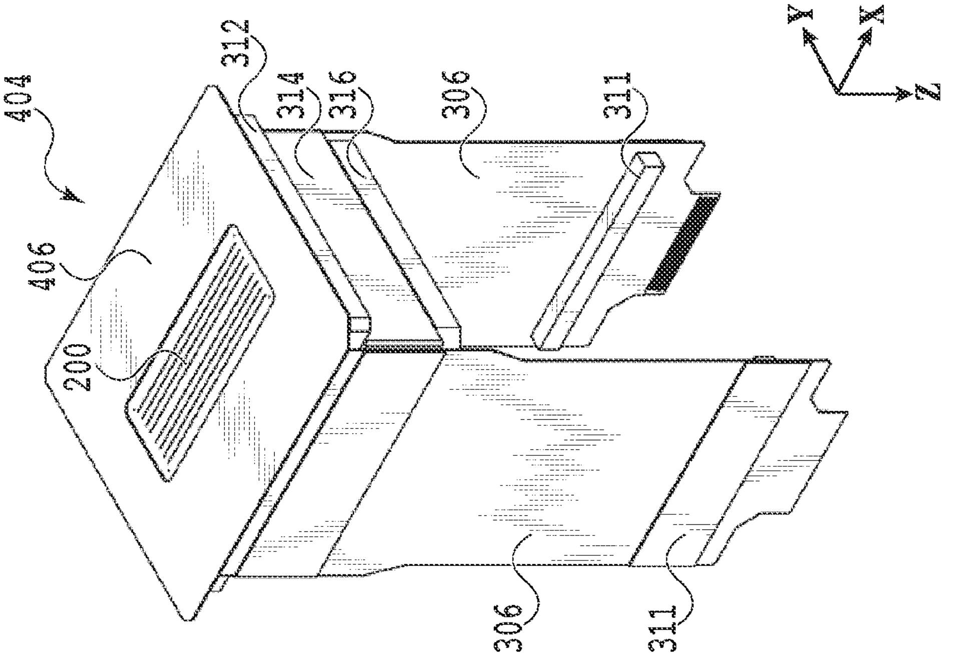
FIG. 5A and FIG. 5B are perspective configuration diagrams of an ejection module.
Figure 5A:
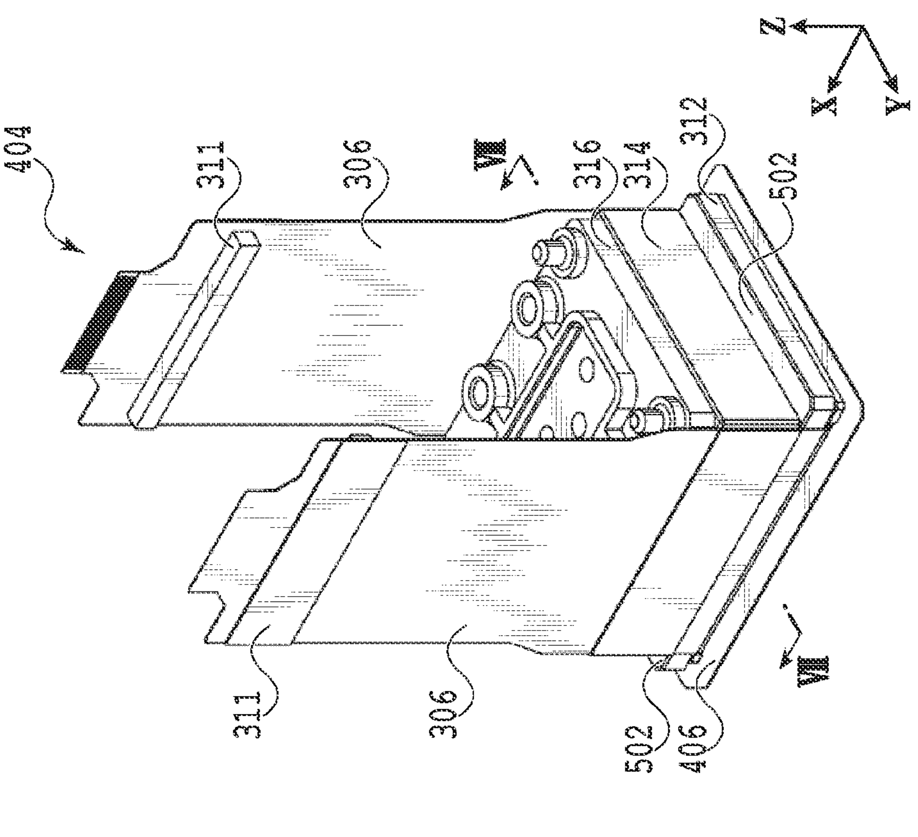
Figure 6:
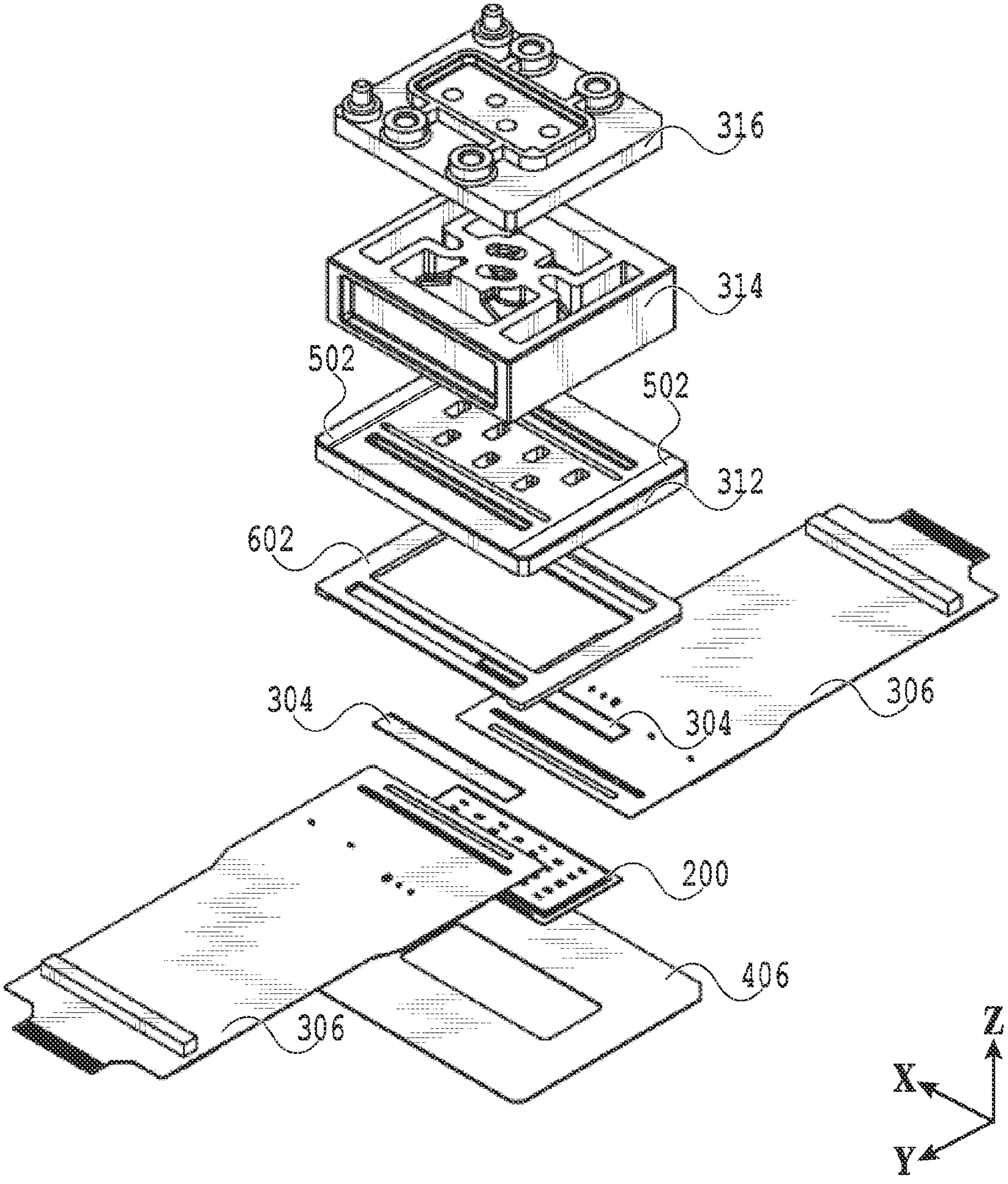
FIG. 6 is an exploded diagram of the ejection module.
Figure 7:
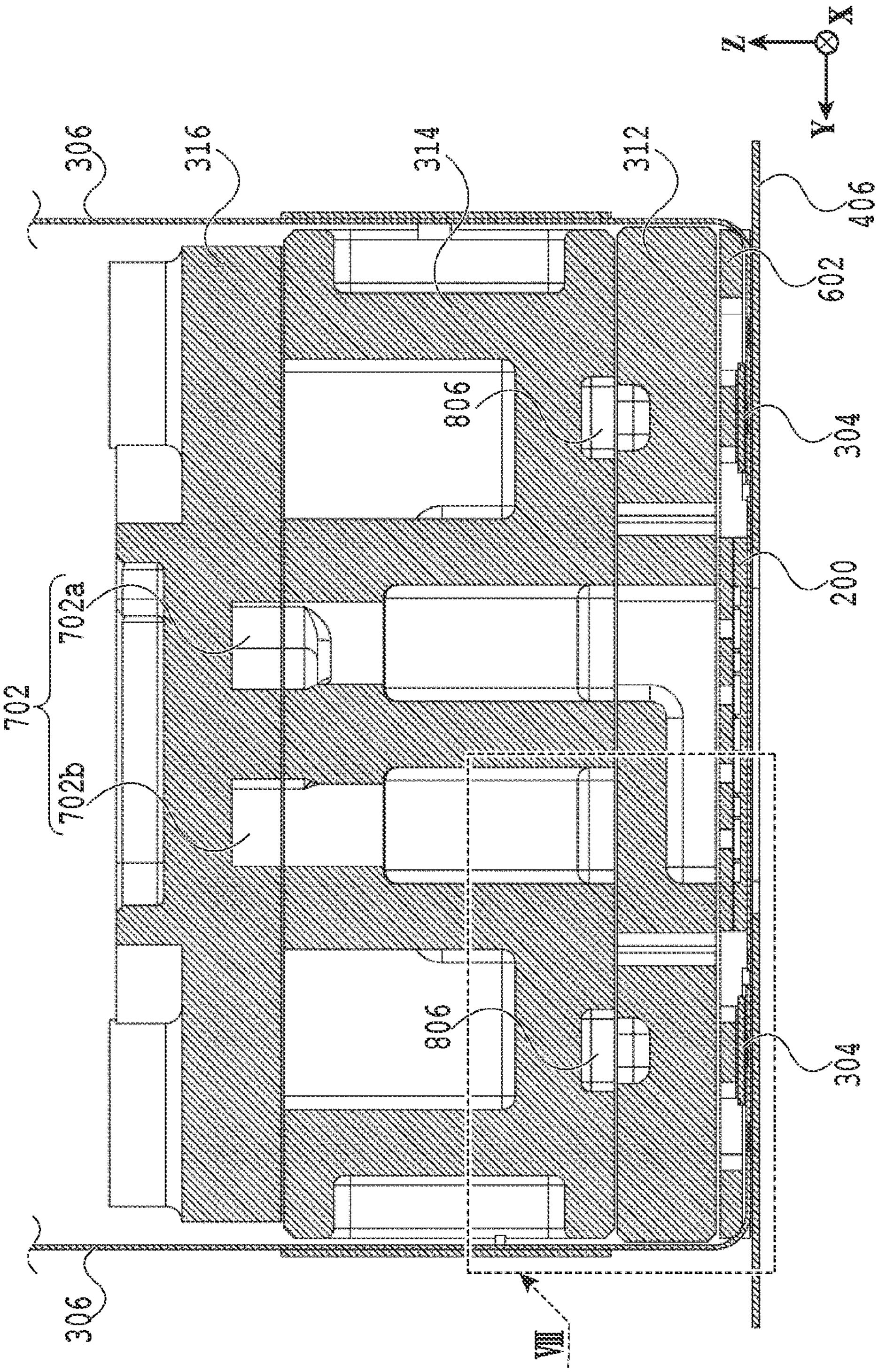
FIG. 7 is a cross-sectional diagram of the VII-VII line of FIG. 5A.
Figure 8:
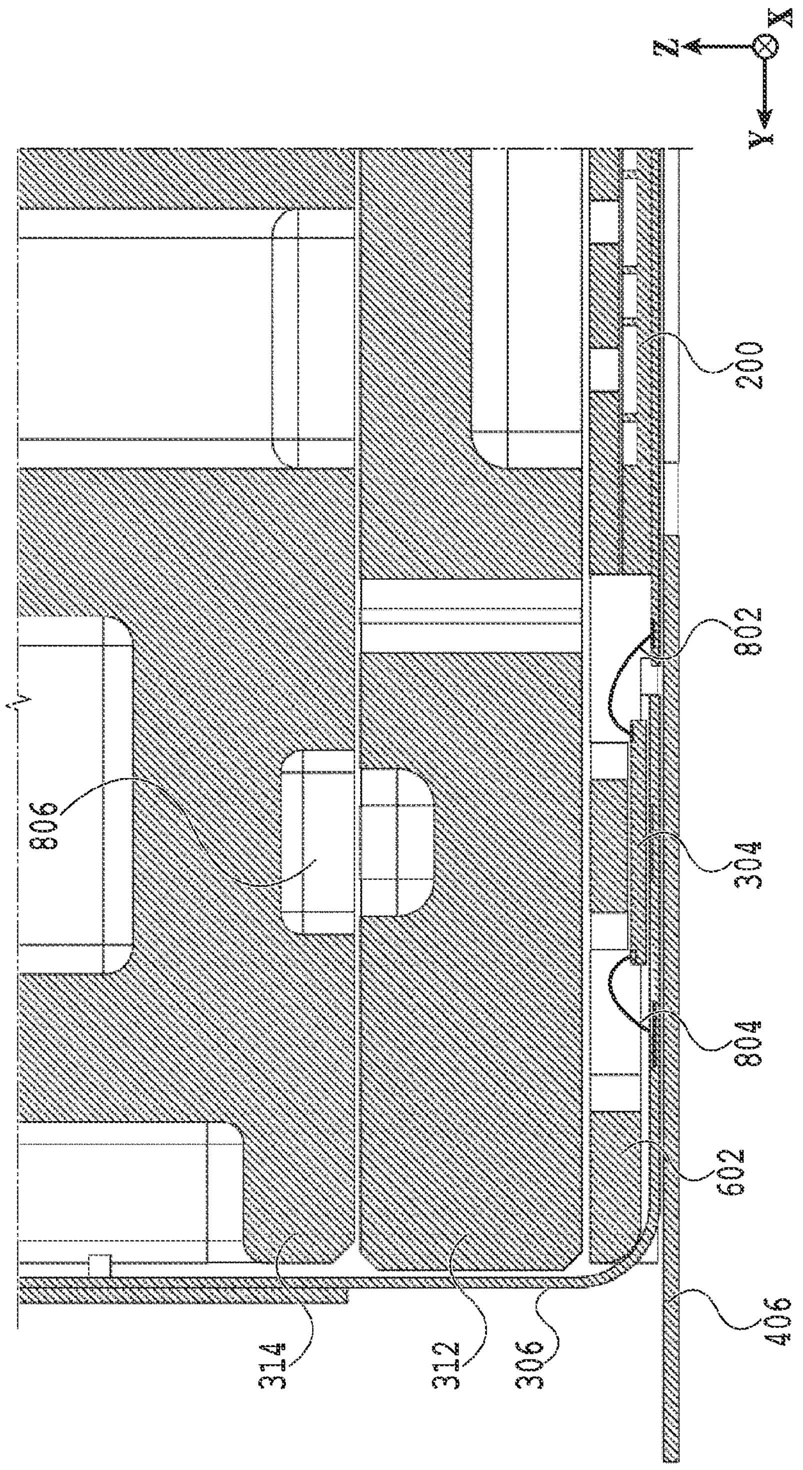
FIG. 8 is an enlarged diagram in the VIII frame of FIG. 7.

Next, a detailed explanation is given of the configuration of the ejection module 404. FIG. 5A and FIG. 5B are perspective configuration diagrams of an ejection module. FIG. 5A is a diagram viewed from the downstream side in the +Z direction, and FIG. 5B is a diagram viewed from the upstream side in the +Z direction. FIG. 6 is an exploded view of the ejection module. FIG. 7 is a cross-sectional diagram of the VII-VII line of FIG. 5A. FIG. 8 is an enlarged diagram in the frame VIII of FIG. 7.

In the ejection module 404, the print element substrate 200 and the flexible wiring substrates 306 are adjoined to the print element substrate support member 406 so as to be supported (see FIG. 6). On the flexible wiring substrates 306, electrodes for grounding the drive circuit substrates 304 are installed, and the drive circuit substrates 304 are fixed with a conductive adhesive agent. In the print element substrate support member 406, the print element substrate 200 and the drive circuit substrates 304 are electrically connected with the bonding wire 802, and the drive circuit substrates 304 and the flexible wiring substrates 306 are electrically connected with the bonding wire 804 (see FIG. 8).

The drive circuit substrates 304 are connected to the first flow path member 312 via the heat-dissipating member 602 in order to suppress a temperature rise due to heat generated at the time of driving the drive circuit substrates 304 (see FIG. 6). Note that, in the ejection module 404, the coolant flow paths 806 are formed with the first flow path member 312 and the second flow path member 314 right above the drive circuit substrates 304. A coolant flows through these coolant flow paths 806. Therefore, heat generated in the drive circuit substrates 304 is dissipated to the first flow path member 312 via the heat-dissipating member 602. Further, the heat dissipated to the first flow path member 312 is then absorbed by the coolant in the coolant flow paths 806. Therefore, it is preferable to form the first flow path member 312 from a material with high thermal conductivity such as alumina.

In the ejection module 404, the liquid flow path part 702 is formed with the first flow path member 312, the second flow path member 314, and the third flow path member 316 (see FIG. 7). The liquid flow path part 702 includes the liquid flow path part 702*a*, which stores ink to be supplied to the print element substrate 200, and the liquid flow path part 702*b*, which stores ink collected from the print element substrate 200. Ink is supplied from the liquid supply unit 322 to the liquid flow path part 702*a* via the fourth flow path member 318 and the fifth flow path member 320. The ink stored in the liquid flow path part 702*b* is collected by the liquid supply unit 322 via the fourth flow path member 318 and the fifth flow path member 320.

In the ejection module 404, the first flow path member 312, the second flow path member 314, and the third flow path member 316, which configure the flow path of ink, have approximately the same length in the Y direction. Further, the second flow path member 314 and the third flow path member 316 have approximately the same length in the X direction. The first flow path member 312 is formed to be longer in the X direction than the second flow path member 314 and the third flow path member 316 (see FIG. 10). The second flow path member 314 is adhered at the approximately center position of the first flow path member 312 with respect to the X direction. Therefore, if the first flow path member 312 and the second flow path member 314 are adhered together, predetermined regions where the second flow path member 314 is not adhered are formed at both ends of the first flow path member 312 in the X direction (predetermined direction). In the first flow path member 312, the convex parts 502 that protrude in the Z direction are formed in the predetermined regions, which are formed at both ends in the X direction. Note that the convex parts 502 extend in the Y direction at positions where the second flow path member 314 adhered on the first flow path member 312 does not come into contact. Further, the convex parts 502 are formed so as not to make contact with the second flow path member 314 adhered to the first flow path member 312, for example, in the predetermined regions formed at both ends of the first flow path member 312 in the X direction.

<Adjoining State of the Ejection Module>

Figure 9:
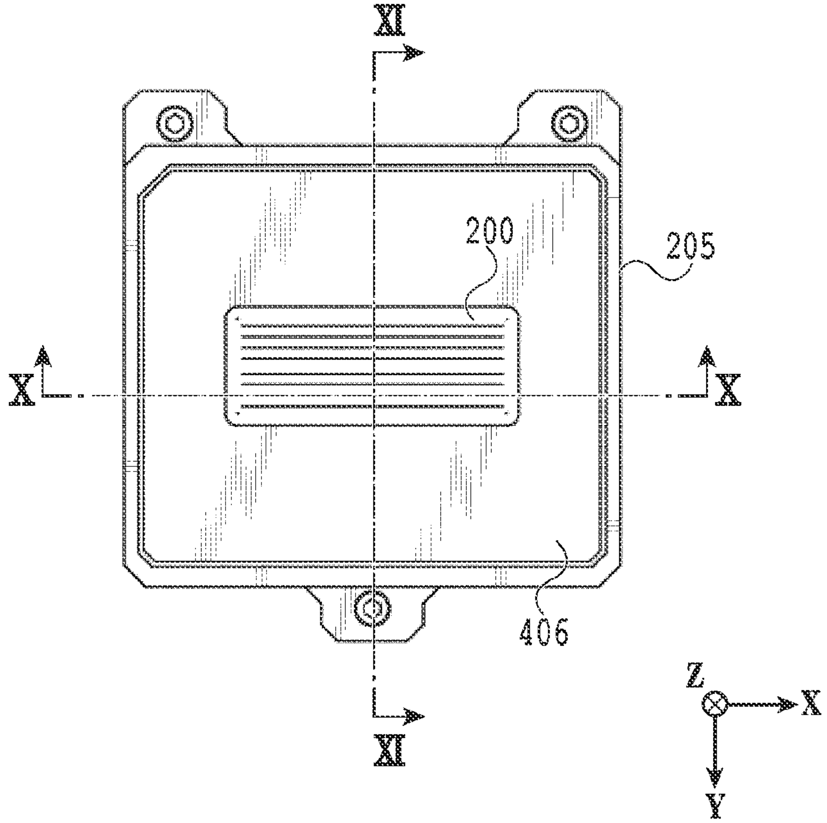
FIG. 9 is a diagram viewed in the IX arrow of FIG. 2A.
Figure 10:
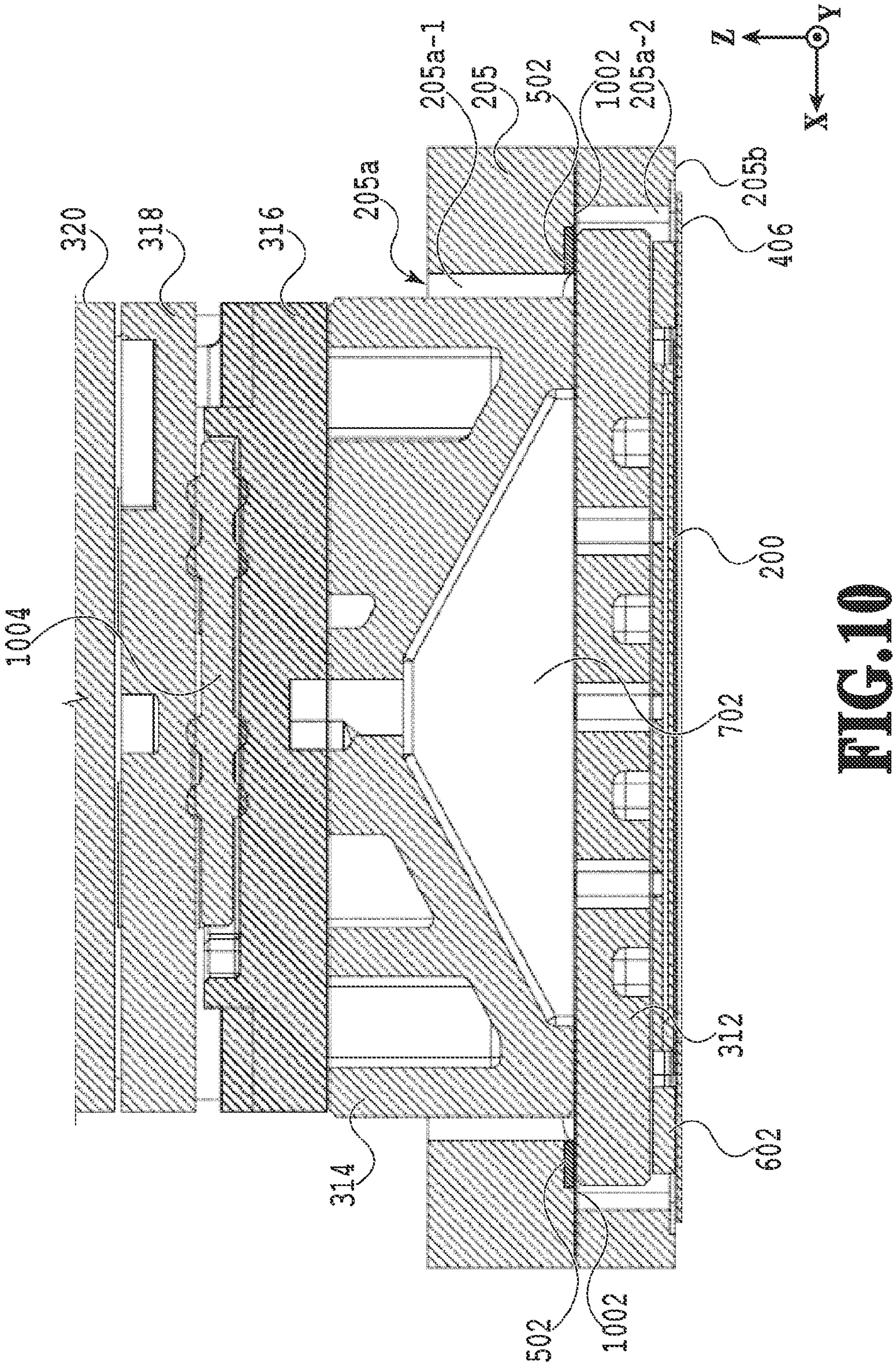
FIG. 10 is a cross-sectional diagram of the X-X line of FIG. 9.
Figure 11:
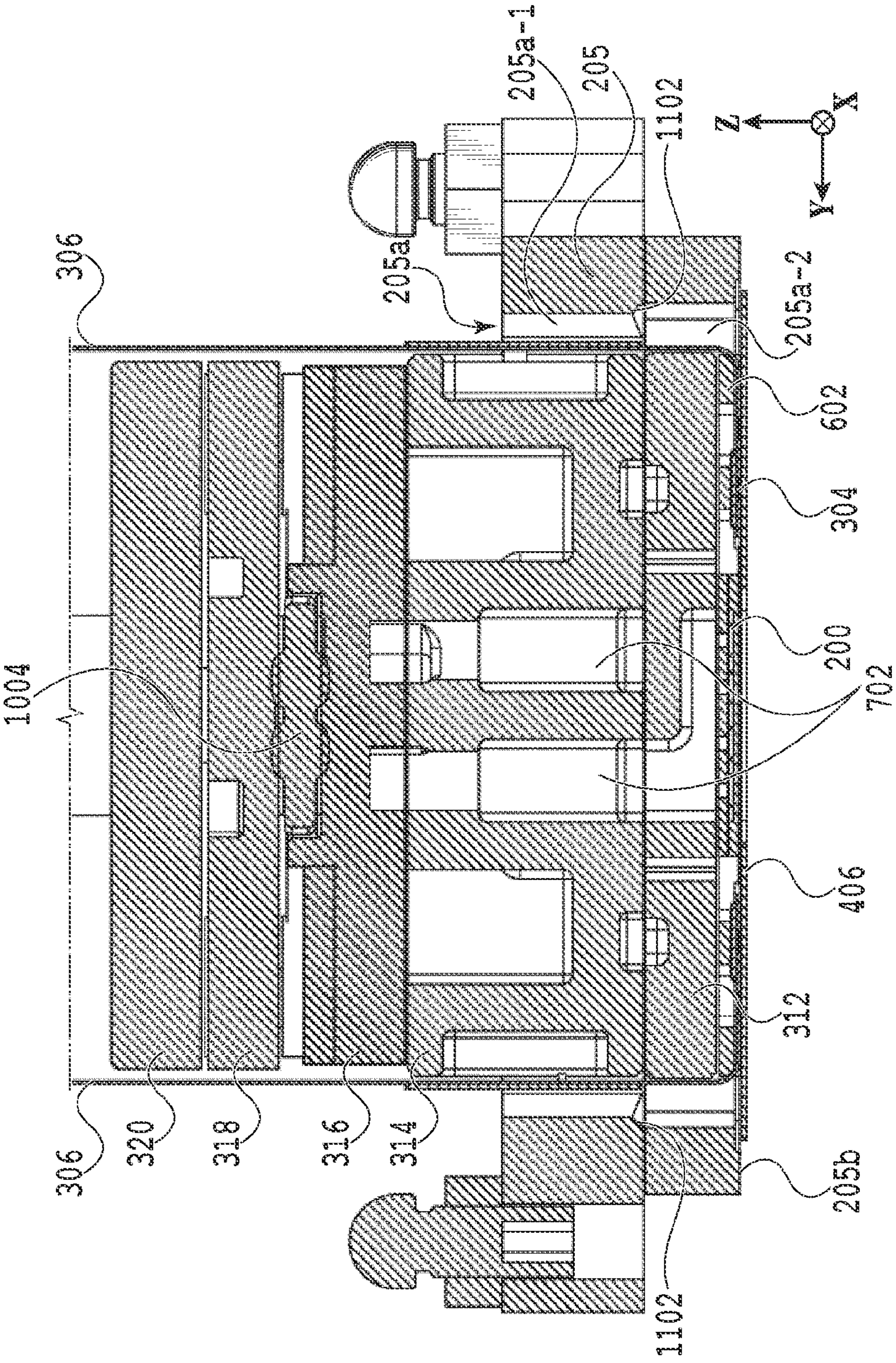
FIG. 11 is a cross-sectional diagram of the XI-XI line of FIG. 2.

Next, an explanation is given of adjoining of the ejection module 404 in the print head 22. In the print head 22, while the substrate part 202 and the flow path part 204 are accommodated in the cover member 206 in a state of being connected to each other, the ejection module 404 is supported by the support member 205. Note that the cover member 206 is adhered to the support member 205 with an adhesive agent or the like, for example. FIG. 9 is a diagram viewed in the IX arrow of FIG. 2A. FIG. 10 is a cross-sectional diagram of the X-X line of FIG. 9. FIG. 11 is a cross-sectional diagram of the XI-XI line of FIG. 9.

In the ejection module 404, the flexible wiring substrates 306 are bent toward the side surfaces parallel to the XZ plane of the first flow path member 312, the second flow path member 314, and the third flow path member 316 and supported by the support member 205 (see FIG. 4 and FIG. 5A).

The support member 205 that supports the ejection module 404 is equipped with the opening 205*a* penetrating in the Z direction (see FIG. 4). The opening 205*a* is configured of the upper opening 205*a*-1 located downstream in the +Z direction and the lower opening 205*a*-2 located upstream in the +Z direction (see FIG. 10 and FIG. 11). The upper opening 205*a*-1 and the lower opening 205*a*-2 have approximately rectangular shapes. The opening area of the lower opening 205*a*-2 is designed to be larger than the opening area of the upper opening 205*a*-1. More specifically, the opening area of the upper opening 205*a*-1 is designed to be larger than the second flow path member 314 and smaller than the first flow path member 312. Further, the lower opening 205*a*-2 is designed to be larger than the first flow path member 312 and smaller than the print element substrate support member 406.

Therefore, in the opening 205*a*, the inner walls are bent at the boundary between the upper opening 205*a*-1 and the lower opening 205*a*-2, so that the wall surfaces 1102 extending in the X direction (see FIG. 11) and the wall surfaces 1002 extending in the Y direction and approximately parallel to the XY plane (see FIG. 10) are formed. That is, the wall surfaces 1102 are formed at both ends of the opening 205*a* with respect to the Y direction, and the wall surfaces 1002 are formed at both ends of the opening 205*a* with respect to the X direction. The wall surfaces 1002 have a predetermined length in the X direction, which is a size capable of being adhered to the convex parts 502 formed at both ends of the first flow path member 312 with respect to the X direction if the ejection module 404 is supported by the support member 205.

The ejection module 404 is inserted from the upstream side in the +Z direction into the opening 205*a* of the support member 205 formed as described above. If the ejection module 404 is inserted into the opening 205*a*, the second flow path member 314 and the third flow path member 316 pass through the lower opening 205*a*-2 and are inserted into the upper opening 205*a*-1. On the other hand, the first flow path member 312 is inserted into the lower opening 205*a*-2 but cannot be inserted into the upper opening 205*a*-1 because the convex parts 502 and the wall surfaces 1002 make contact with each other.

Then, registration of the ejection module 404 and the support member 205 is performed so that the second flow path member 314 does not make contact with the inner walls of the upper opening 205*a*-1 and the first flow path member 312 does not make contact with the inner walls of the lower opening 205*a*-2. Here, the first flow path member 312 and the second flow path member 314 are arranged to face the support member 205 with a space therebetween. Specifically, a space is formed between the second flow path member 314 and the upper opening 205*a*-1, and the second flow path member 314 and the upper opening 205*a*-1 are arranged to face each other. Further, a space is formed between the first flow path member 312 and the lower opening 205*a*-2, and the first flow path member 312 and the lower opening 205*a*-2 are arranged to face each other. Note that the members such as the opening 205*a*, the first flow path member 312, and the second flow path member 314 are designed so that these spaces are large enough to accept thermal expansion of the first flow path member 312 and the second flow path member 314. That is, each member is designed so that, even if thermal expansion occurs in the first flow path member 312 and the second flow path member 314, these flow path members do not abut on the lower opening 205*a*-2 and the upper opening 205*a*-1 or, even if they do, they do not deform the support member 205.

Further, if the registration of the ejection module 404 and the support member 205 is performed, only the convex parts 502 and the wall surfaces 1002 abut on each other, and thus these members are adhered with an adhesive agent, so that thereby the ejection module 404 is fixed and supported by the support member 205. As described above, in the present embodiment, the ejection module 404 is supported by the support member 205 in a state where the convex parts 502 of the first flow path member 312 and the wall surfaces 1002 of the support member 205 abut on each other in the inserting direction of the ejection module 404. In the present embodiment, the convex parts 502 function as abutment parts that abut on the support member 205. Further, the wall surfaces 1002 are parts of the support member 205 that abut on the convex parts 502 of the first flow path member 312.

Furthermore, if the registration of the ejection module 404 and the support member 205 is performed, the print element substrate support member 406 is supported by the insertion surface of the support member 205 through which the ejection module 404 is inserted. i.e., the bottom surface 205*b*. That is, in the present embodiment, the ejection module 404 is supported by the support member 205 by inserting the ejection module 404 into the support member 205 for engagement. Here, the +Z direction is the inserting direction for inserting the ejection module 404 into the support member 205.

The fourth flow path member 318 is fluidly connected via the seal member 1004 or the like to the ejection module 404 supported by the support member 205 as described above. Furthermore, the print head 22 is assembled such that the fifth flow path member 320, the liquid supply unit 322, and the like are fluidly connected onto the fourth flow path member 318 and the electrical wiring substrate support part 402 and the like are attached.

As explained above, the present embodiment is configured so that the ejection module 404 is inserted into the support member 205 for engagement, so as to be supported. Here, the first flow path member 312 and the second flow path member 314 are arranged to face the support member 205 with a space therebetween in a direction intersecting the inserting direction of the ejection module 404. Note that the space has a size that can accept thermal expansion of the first flow path member 312 and the second flow path member 314. Further, in the inserting direction, the first flow path member 312 is configured to make contact with the wall surfaces 1002 of the support member 205, so as to be supported.

Accordingly, the support member 205 is less likely to deform even if the first flow path member 312 and the second flow path member 314 thermally expand due to heat generated at the time of operating the drive circuit substrates 304, heat generated by a large amount of current flowing to the flexible wiring substrates 306, etc. Specifically, spaces that can accept thermal expansion of the flow path members are formed between the first flow path member 312 and the lower opening 205*a*-2 and between the second flow path member 314 and the upper opening 205*a*-1. Therefore, even if thermal expansion occurs in the first flow path member and the second flow path member, the flow path members are less likely to push the opening 205*a*, and thus the support member 205 is less likely to deform.

Further, by suppressing deformation of the support member 205, deformation of the print element substrate support member 406 which is supported by the bottom surface 205*b* of the support member 205 is suppressed. Accordingly, misalignment of the arrangement position of the print element substrate 200 which is supported by the print element substrate support member 406 is suppressed.

Second Embodiment

Next, with reference to FIG. 12A to FIG. 17, an explanation is given of a liquid ejection head according to the second embodiment. Note that, in the following explanation, the same or corresponding configurations as those of the liquid ejection head according to the first embodiment described above are assigned with the same signs as those used in the first embodiment, so as to omit detailed explanations thereof.

The second embodiment differs from the above-described first embodiment in the aspect that the four print element substrates 200 capable of ejecting ink are arranged in a staggered pattern in the print head 22.

<Configuration of the Print Heads>

Figure 12B:
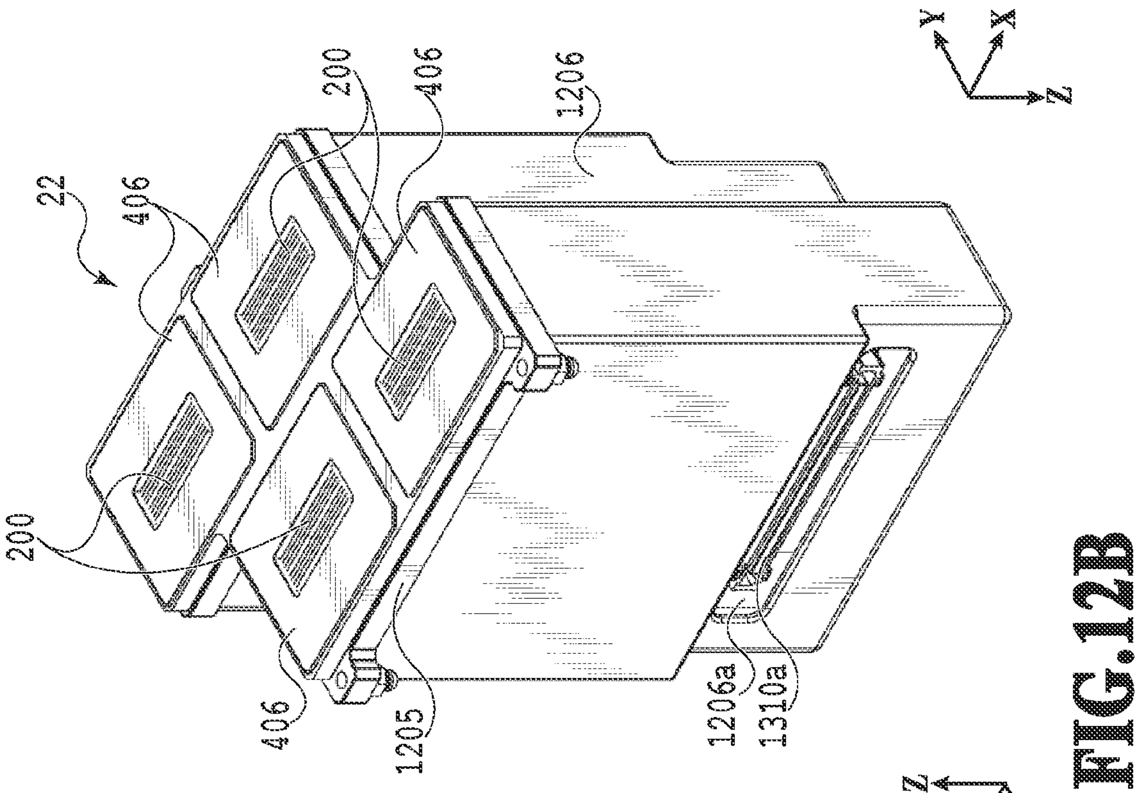
FIG. 12A and FIG. 12B are perspective configuration diagrams of a print head in a different embodiment.
Figure 12A:
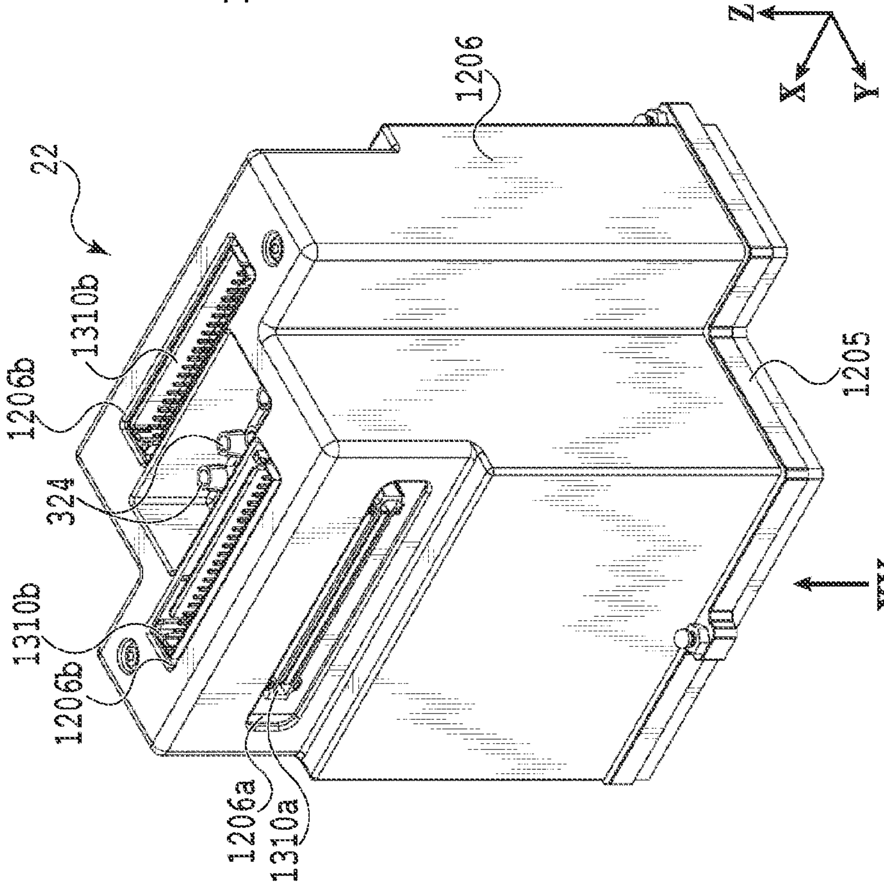
Figure 13B:
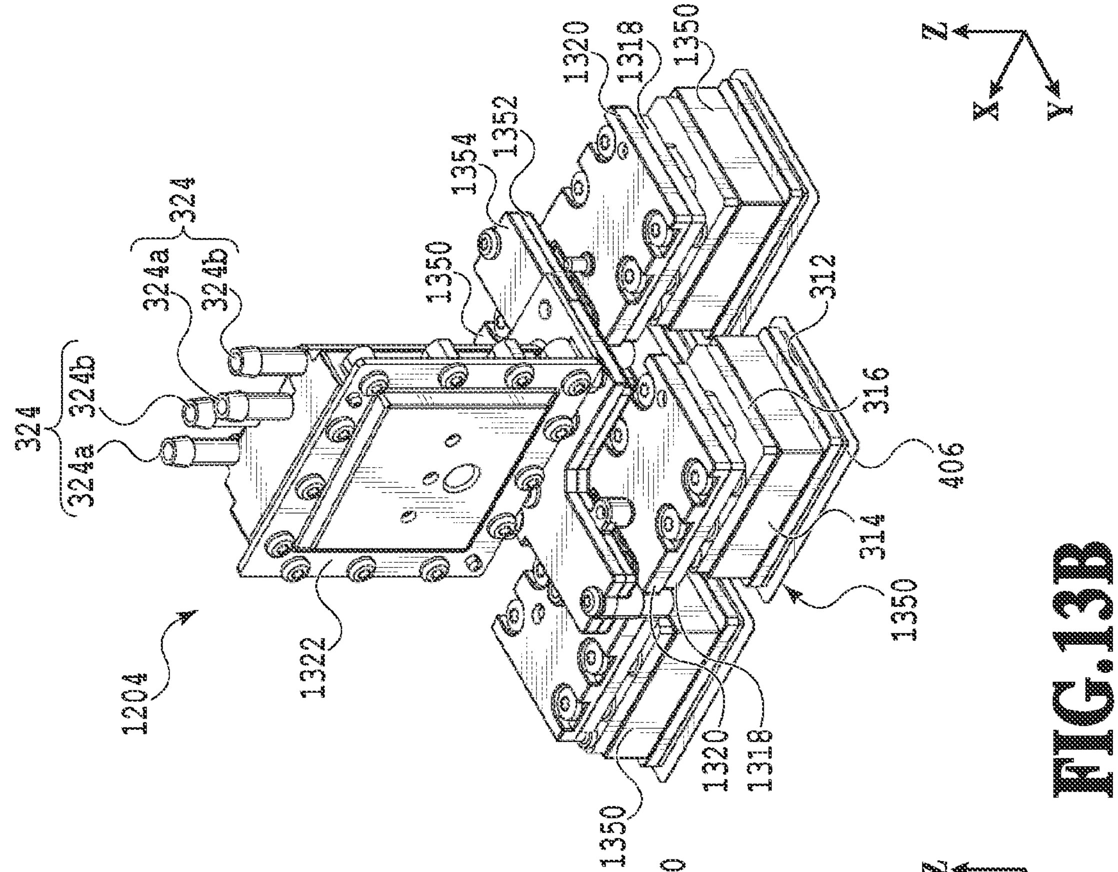
FIG. 13A and FIG. 13B are perspective configuration diagrams of a substrate part and a flow path part of the print head of FIG. 12A and FIG. 12B.
Figure 13A:
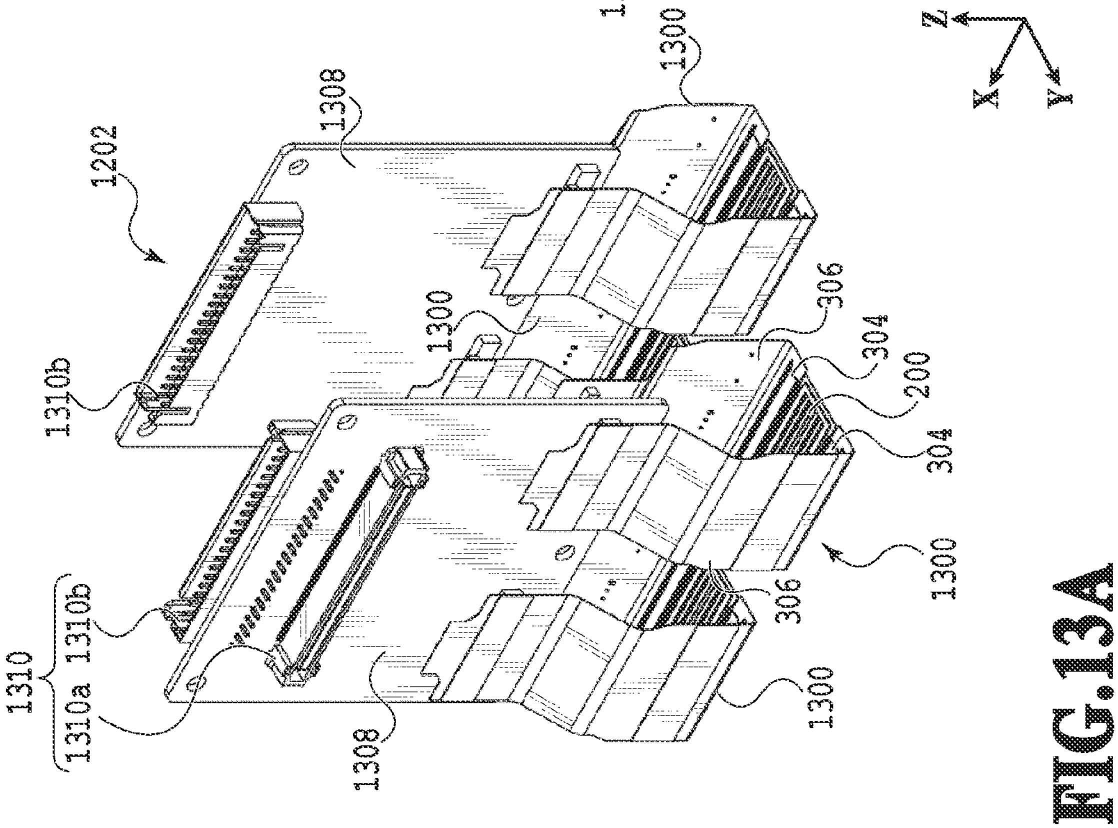
Figure 14:
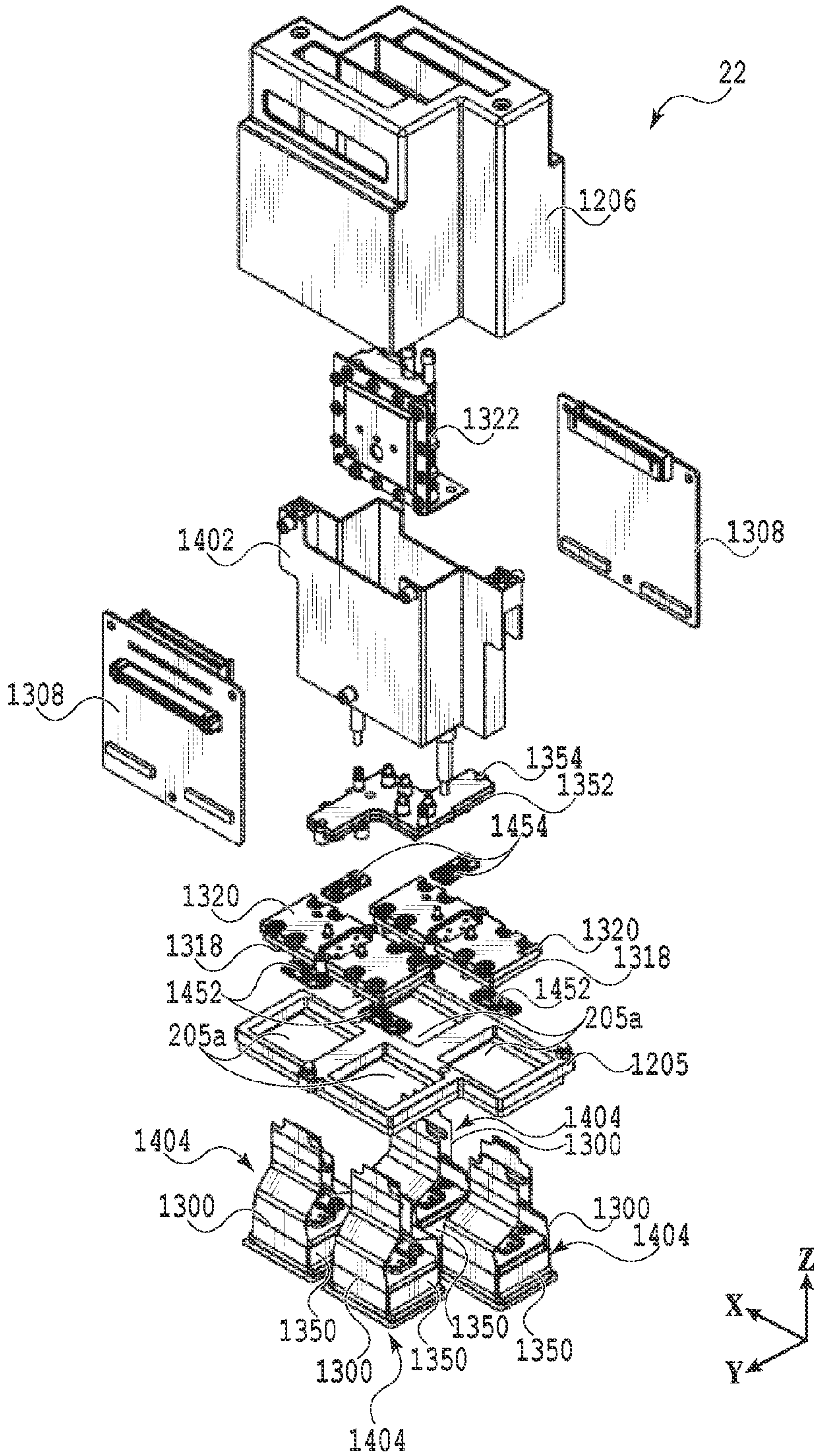
FIG. 14 is an exploded diagram of the print head of FIG. 12A and FIG. 12B.

An explanation is given of a print head as a liquid ejection head in the present embodiment. FIG. 12A and FIG. 12B are perspective configuration diagrams of a print head in the present embodiment. FIG. 12A is a diagram viewed from the downstream side in the +Z direction, and FIG. 12B is a diagram viewed from the upstream side in the +Z direction. FIG. 13A and FIG. 13B are perspective configuration diagrams of a printing part and a flow path part accommodated inside the print head of FIG. 12A and FIG. 12B. FIG. 13A is the substrate part, and FIG. 13B is the flow path part. FIG. 14 is an exploded diagram of the print head.

The print head 22 is equipped with the substrate part 1202, which includes the print element substrates 200 capable of ejecting ink, and the flow path part 1204, in which flow paths for supplying and collecting ink to and from the print element substrates 200 are formed (see FIG. 13A and FIG. 13B). In the present embodiment, the print head 22 is equipped with the four print element substrates 200, and the print element substrates 200 are arranged in a staggered pattern. In the print head 22, the substrate part 1202 and the flow path part 1204 are connected to each other and are accommodated in the cover member 1206 in a state of being supported by the support member 1205. Here, the flow path connection parts 324 for connecting to external flow paths are in the state of exposing from the upper side of the print head 22 (see FIG. 12A). Further, on the lower surface of the print head 22, the print element substrates 200 are exposed in the state of being supported by the print element substrate support members 406 (see FIG. 12B).

The substrate part 1202 is equipped with the four substrate groups 1300 including the print element substrates 200, the drive circuit substrates 304, and the flexible wiring substrates 306, and these four substrate groups 1300 are connected to the electrical wiring substrates 1308, respectively. The print element substrates 200 are electrically connected via the drive circuit substrates 304, the flexible wiring substrates 306, and the electrical wiring substrates 1308 to a control part that controls the entire printing apparatus 10.

One electrical wiring substrate 1308 is installed for two substrate groups 1300, respectively. Accordingly, the substrate part 1202 is equipped with the two electrical wiring substrates 1308. The electrical wiring substrates 1308 are connected to the substrate groups 1300 via the electrical connection parts 311 of the flexible wiring substrates 306 in two substrate groups 1300 arranged adjacent to each other in the X direction. Each electrical wiring substrate 1308 is equipped with the electrical connection terminals 1310 corresponding to the respective substrate groups 1300 to be connected to. Therefore, two electrical connection terminals 1310 are installed on the electrical wiring substrates 1308. Specifically, in the electrical wiring substrates 1308, the electrical connection terminals 1310*a* corresponding to one substrate group 1300 are installed in the Y direction, and the electrical connection terminals 1310*b* corresponding to the other substrate group 1300 are installed in the +Z direction.

Regarding the two side surfaces parallel to the XZ plane in the cover member 1206, the openings 1206*a* are installed at the upper parts thereof. Further, the two openings 1206*b* are installed on the upper surface of the cover member 1206. Further, if the substrate part 1202 and the flow path part 1204 are accommodated in the cover member 1206, the electrical connection terminals 1310*a* are exposed to the outside through the openings 1206*a*, and the electrical connection terminals 1310*b* are exposed to the outside through the openings 1206*b* (see FIG. 12A and FIG. 12B). The wiring connected to the control part of the printing apparatus 10 is connected to the electrical connection terminals 1310. Accordingly, ejection drive signals output from the control part and the electric power necessary for ejection are input from the electrical connection terminals 1310 and supplied to the print element substrates 200 of the respective substrate groups 1300.

With the wiring consolidated by the electric circuit on the electrical wiring substrates 1308, the number of terminals in the electrical connection terminals 1310 can be reduced compared to the number of terminals in the print element substrates 200. Accordingly, it is possible to reduce the number of electrical connection parts that need to be removed at the time of replacing the print head 22 in the printing apparatus 10. Further, in the substrate groups 1300, the print element substrates 200 and parts of the flexible wiring substrates 306 are supported by the print element substrate support members 406. If the substrate part 1202 and the flow path part 1204 are accommodated in the cover member 1206, the print element substrate support members 406 are supported by the support member 1205 and positioned on the lower surface of the print head 22. The print element substrate support members 406 are supported so that the print element substrates 200 are exposed from the bottom surface of the print head 22.

The flow path part 1204 is equipped with the four flow path groups 1350 to which the first flow path members 312, the second flow path members 314, and the third flow path members 316 are fluidly connected. The flow path groups 1350 are connected to the substrate groups 1300, respectively, and the print element substrates 200 and the first flow path members 312 are fluidly connected. Further, the flow path part 1204 is equipped with two sets of the fourth flow path members 1318 and the fifth flow path members 1320. The fourth flow path members 1318 and the fifth flow path members 1320 are connected to each other as flow paths and are connected to two flow path groups 1350 adjacent to each other in the X direction. Therefore, in the fourth flow path members 1318 and the fifth flow path members 1320, flow paths that supply ink to the above-described two flow path groups 1350 and flow paths that collect ink from the flow path groups 1350 are formed. Further, the fourth flow path members 1318 are connected to the third flow path members 316 in the corresponding flow path groups 1350 via the seal members 1452 (see FIG. 14).

In the flow path part 1204, the sixth flow path member 1352 and the seventh flow path member 1354 are fluidly connected to the two fifth flow path members 1320, which are positioned adjacent in the Y direction and fluidly connected to the fourth flow path members 1318. Specifically, the sixth flow path member 1352 is fluidly connected to the two fifth flow path members 1320 via the seal members 1454, and the seventh flow path member 1354 is fluidly connected to the sixth flow path member 1352.

The flow path part 1204 is equipped with the liquid supply unit 1322. The liquid supply unit 1322 is fluidly connected to the seventh flow path member 1354. In the liquid supply unit 1322, the two pairs of flow path connection parts 324 are installed on the upper surface thereof. A filter (not illustrated in the drawings) for removing foreign substances in the flowing ink is installed inside the liquid supply unit 1322 so as to communicate with the respective openings of the flow path connection parts 324. The flow path connection parts 324 are connected to the ink supply system of the printing apparatus 10. Specifically, the flow path connection parts 324 installed in the liquid supply unit 1322 are equipped with the flow path connection parts 324*a* for supplying ink into the liquid supply unit 1322 and the flow path connection parts 324*b* for collecting ink from the liquid supply unit 1322. One of the two pairs of flow path connection parts 324 installed in the liquid supply unit 1322 supply and collect ink to and from the two flow path groups 1350 positioned upstream in the +Y direction. Further, the other one of the two pairs of flow path connection parts 324 supply and collect ink to and from the two flow path groups 1350 positioned downstream in the +Y direction.

As described above, the flow path of the flow path part 1204 is fluidly connected to the flow paths of the four print element substrates 200. Therefore, the present embodiment is configured so that the ink circulates in the ink flow path system, which includes the flow path of the printing apparatus 10 and the flow path of the print head 22. The inks supplied to the liquid supply unit 1322 pass through the seventh flow path member 1354, the sixth flow path member 1352, the fifth flow path members 1320, and the fourth flow path members 1318 to flow into the flow path groups 1350 and be supplied to the print element substrates 200 via the flow path groups 1350. Further, the inks supplied to the print element substrates 200 pass through the flow path groups 1350, the fourth flow path members 1318, the fifth flow path members 1320, the sixth flow path member 1352, and the seventh flow path member 1354 to be collected from the print element substrates 200 to the liquid supply unit 1322.

In the print head 22, the electrical wiring substrate support part 1402 is installed so as to surround the outer periphery of the liquid supply unit 1322. If the substrate part 1202 and the flow path part 1204 are connected to each other, the electrical wiring substrates 1308 are supported by the electrical wiring substrate support part 1402. In the present embodiment, it is assumed that the substrate group 1300 and the flow path group 1350 form the ejection modules 1404 (see FIG. 14). That is, the print head 22 is equipped with the four ejection modules 1404. Note that, since the configuration of the ejection modules 1404 is the same as the ejection module 404 explained in the above-described first embodiment, a detailed explanation thereof is omitted in the present embodiment.

<Adjoining State of the Ejection Modules>

Figure 15:
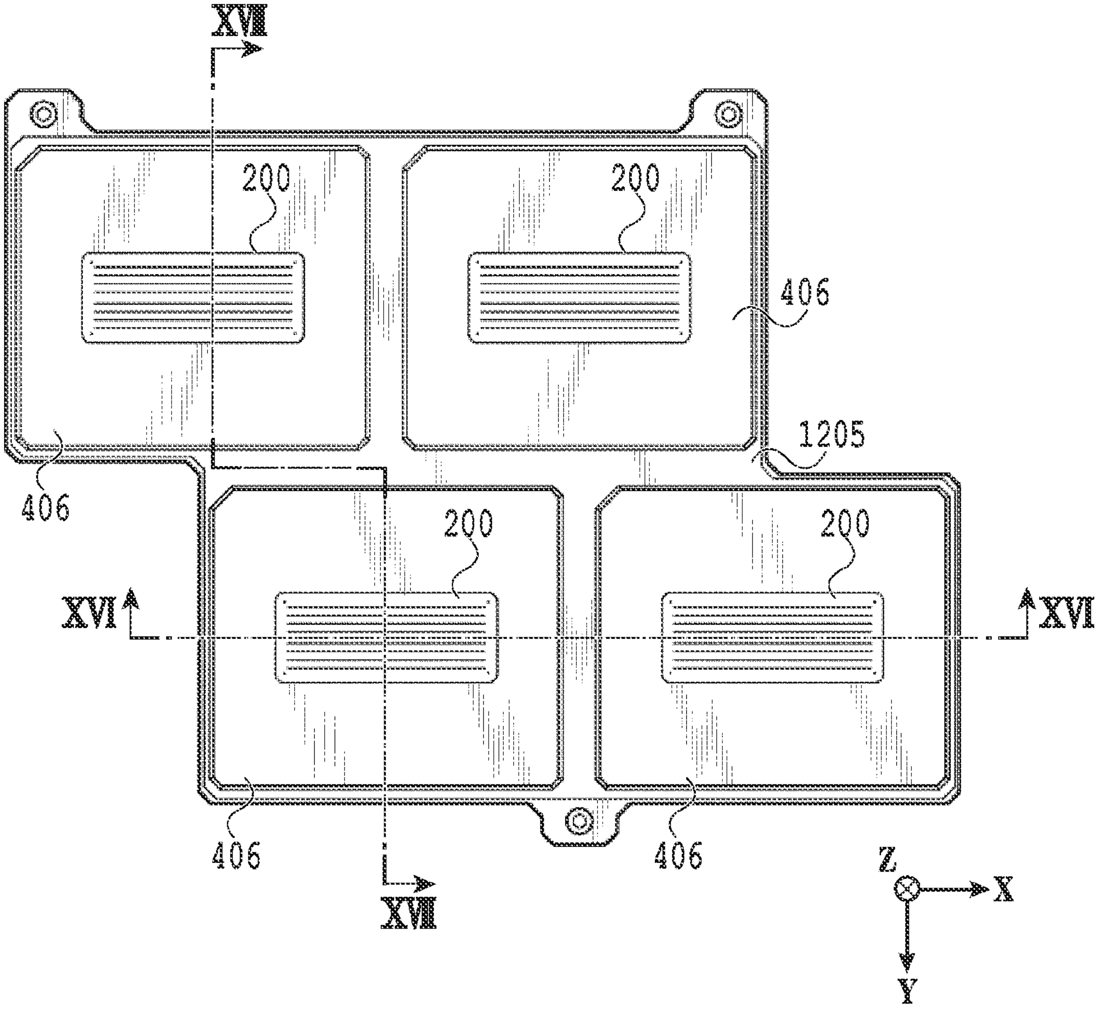
FIG. 15 is a diagram viewed in the XV arrow of FIG. 12A.
Figure 16:
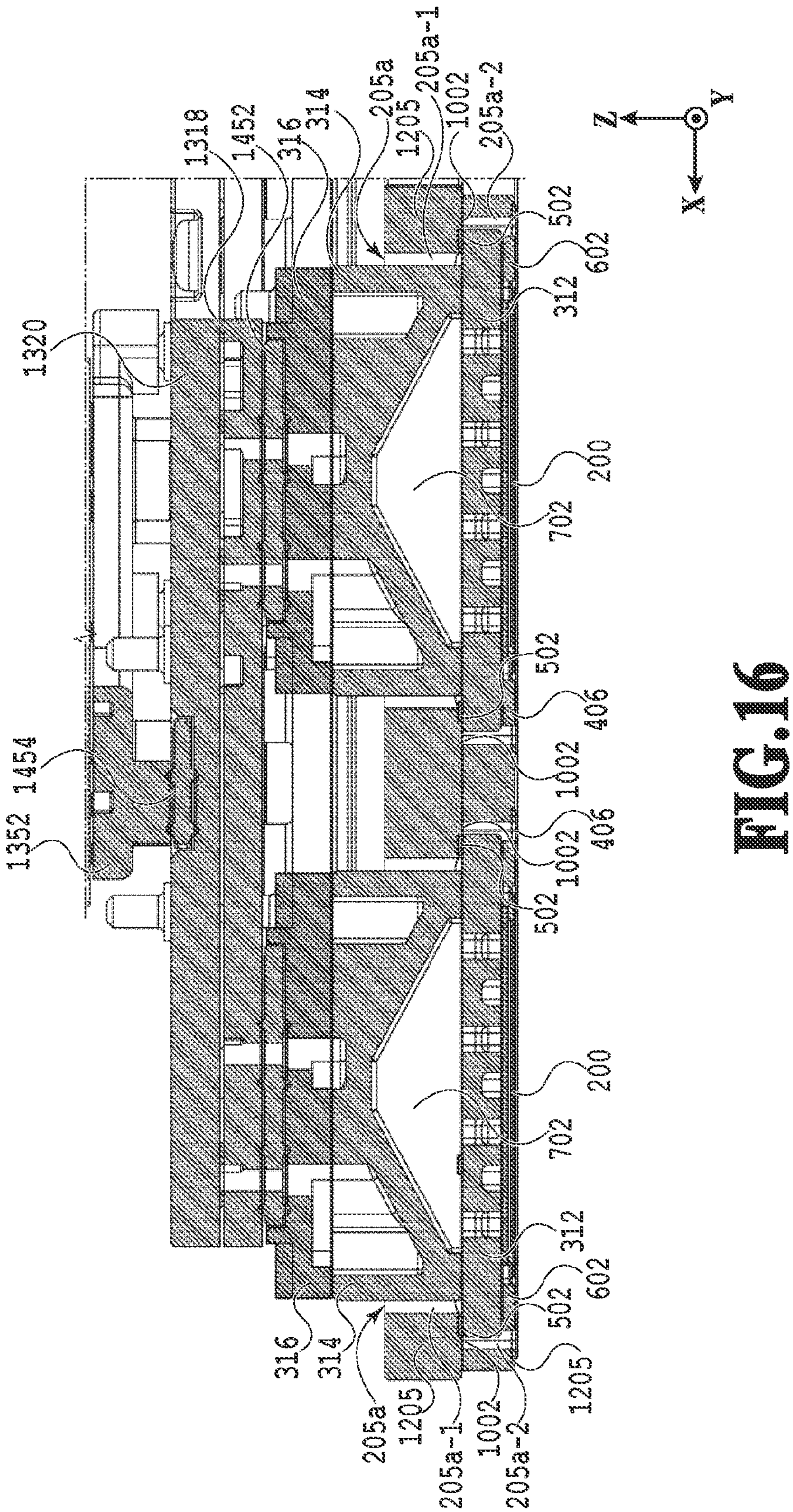
FIG. 16 is a cross-sectional diagram of the XVI-XVI line of FIG. 15.
Figure 17:
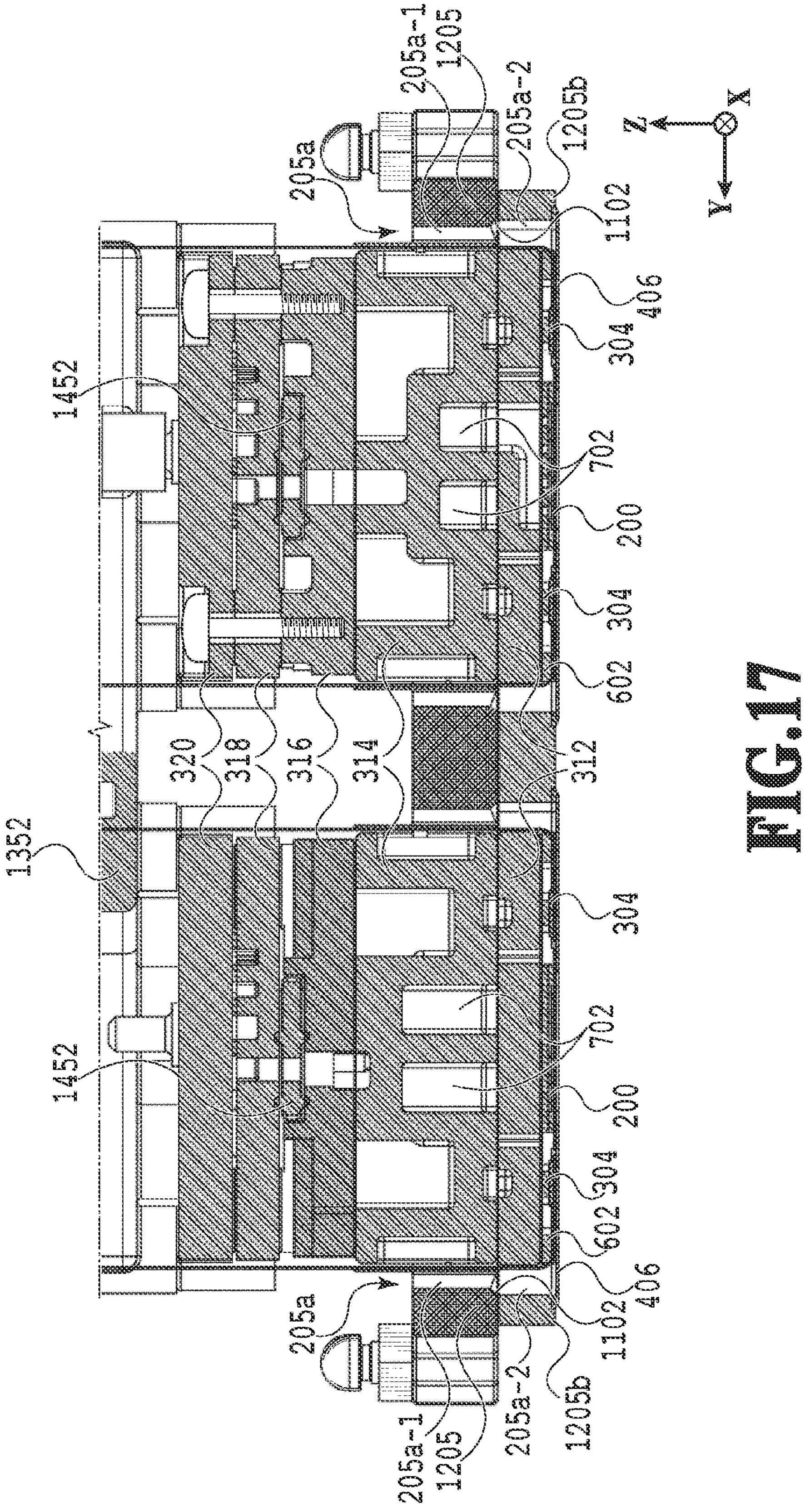
FIG. 17 is a cross-sectional diagram of the XVII-XVII line of FIG. 15.

Next, an explanation is given of adjoining of the ejection modules 1404 in the print head 22. In the print head 22, while the substrate part 1202 and the flow path part 1204 are accommodated in the cover member 1206 in a state of being connected to each other, the ejection modules 1404 are supported by the support member 1205. Note that the cover member 1206 is adhered to the support member 1205 with an adhesive agent or the like, for example. FIG. 15 is a diagram viewed in the XV arrow of FIG. 12A, and FIG. 16 is a cross-sectional diagram of the XVI-XVI line of FIG. 15. FIG. 17 is a cross-sectional diagram of the XVII-XVII line of FIG. 15.

In the ejection modules 1404, the flexible wiring substrates 306 are bent toward the side surfaces parallel to the XZ plane of the first flow path members 312, the second flow path members 314, and the third flow path members 316 and supported by the support member 1205 (see FIG. 14). The support member 1205 that supports the four ejection modules 1404 is equipped with the four openings 205*a* penetrating in the Z direction (see FIG. 14). Since the configuration of the openings 205*a* is explained in the above-described first embodiment, a detailed explanation thereof is omitted.

For supporting the ejection modules 1404 with the support member 1205, the ejection modules 1404 are inserted into the respective openings 205*a* of the support member 1205 from the upstream side in the +Z direction. If the ejection modules 1404 are inserted into the openings 205*a*, the second flow path members 314 and the third flow path members 316 pass through the lower openings 205*a*-2 and are inserted into the upper openings 205*a*-1. On the other hand, the first flow path members 312 are inserted into the lower openings 205*a*-2 but cannot be inserted into the upper openings 205*a*-1 because the convex parts 502 and the wall surfaces 1002 make contact with each other.

Then, registration of the respective ejection modules 1404 and the support member 1205 is performed so that the second flow path members 314 do not abut on the inner walls of the upper openings 205*a*-1 and the first flow path members 312 do not abut on the inner walls of the lower openings 205*a*-2. Here, the first flow path members 312 and the second flow path members 314 are arranged to face the support member 205 with a space therebetween. Specifically, a space is formed between the second flow path members 314 and the upper openings 205*a*-1, and the second flow path members 314 and the upper openings 205*a*-1 are arranged to face each other. Further, a space is formed between the first flow path members 312 and the lower openings 205*a*-2, and the first flow path members 312 and the lower openings 205*a*-2 are arranged to face each other. Note that the members such as the openings 205*a*, the first flow path members 312, and the second flow path members 314 are designed so that these spaces are large enough to accept thermal expansion of the first flow path members 312 and the second flow path members 314. That is, each member is designed so that, even if thermal expansion occurs in the first flow path members 312 and the second flow path members 314, these flow path members do not abut on the lower openings 205*a*-2 and the upper openings 205*a*-1 or, even if they do, they do not deform the support member 1205.

Further, if the registration of the respective ejection modules 1404 and the support member 1205 is performed, the convex parts 502 and the wall surfaces 1002 abut on each other, and thus these members are adhered with an adhesive agent, so that thereby the ejection modules 1404 are fixed and supported by the support member 1205. As described above, in the present embodiment, the ejection modules 1404 are supported by the support member 1205 in a state where the convex parts 502 of the first flow path members 312 and the wall surfaces 1002 of the support member 1205 abut on each other in the inserting direction of the respective ejection modules 1404. Furthermore, if the registration of the ejection modules 1404 and the support member 1205 is performed, the print element substrate support members 406 are supported by the bottom surface 1205*b* of the support member 1205.

The ejection modules 1404 supported by the support member 1205 in this manner are fluidly connected to the fourth flow path members 318 via the seal members 1452. Further, onto the fourth flow path members 1318, the fifth flow path members 1320 are fluidly connected, and the sixth flow path member 1352 is fluidly connected via the seal members 1454. Furthermore, the seventh flow path member 1354, the liquid supply unit 1322, etc., are fluidly connected. Further, the print head 22 is assembled by attaching the electrical wiring substrate support part 1402, etc.

As explained above, the present embodiment is configured so that the four ejection modules 1404 are inserted into the support member 1205 for engagement to be supported. Here, the first flow path members 312 and the second flow path members 314 are arranged to face the support member 1205 with a space therebetween in a direction intersecting the inserting direction of the ejection modules 1404. Note that the space has a size that can accept thermal expansion of the first flow path members 312 and the second flow path members 314. Further, in the inserting direction, the first flow path members 312 are configured to abut on the wall surfaces 1002 of the support member 1205 to be supported. Thus, the printing apparatus 10 according to the present embodiment also has the same functional effects as those of the first embodiment.

OTHER EMBODIMENTS

Note that the above-described embodiments may be modified as shown in the following (1) through (5).

(1) Although not specifically described in the embodiments above, it is preferable that the adhesive agent for adhering the convex parts 502 and the wall surfaces 1002 to each other is an adhesive agent that does not easily transmit heat, i.e., that has low thermal conductivity. Accordingly, the heat in the first flow path member 312 is suppressed from being transmitted to the support member 205 via the convex parts 502, and thus deformation caused by thermal expansion of the support member 205 due to heat transmitted to the support member 205 is suppressed. Further, it is also possible that the adhesive agent for adhering the convex parts 502 and the wall surfaces 1002 has lower thermal conductivity than the first flow path member 312.

Further, it is preferable that the support member 205 is configured of a material whose thermal conductivity and linear expansion coefficient are both low, for example. Accordingly, deformation caused by thermal expansion of the support member 205 is reduced even if the heat is transmitted to the support member 205 via the convex parts 502 and the adhesive agent.

(2) Although not specifically described in the embodiments above, it is also possible that the convex parts 502 are made of a material capable of absorbing thermal expansion occurring in the first flow path member 312, such as an elastic material. Alternatively, as the adhesive agent for adhering the convex parts 502 and the wall surfaces 1002, it is also possible to use an adhesive agent with properties capable of absorbing displacement of the convex parts 502 due to thermal expansion of the first flow path member 312, such as elasticity or expansion and contraction properties. Further, in the embodiments above, although the convex parts 502 are formed so as not to make contact with the second flow path member 314 adhered to the first flow path member 312 in the predetermined regions formed at both ends of the first flow path member 312 in the X direction, there is not a limitation as such. That is, it is also possible that the convex parts 502 are formed so as to make contact with the second flow path member 314 adhered to the first flow path member 312 in the predetermined regions. In this case, it is preferable that the convex parts 502 are formed of a material with low thermal conductivity and a low linear expansion coefficient.

(3) In the embodiments above, although the convex parts 502 are installed at both ends of the first flow path member 312 in the X direction and the supporting is performed by the wall surfaces 1002 of the support members 205 and 1205 via the convex parts 502, there is not a limitation as such. That is, it is also possible that both ends of the first flow path member 312 in the X direction are directly supported by the wall surfaces 1002. Alternatively, it is also possible that the abutment parts are formed so as to be flat without forming a step with the surface of the first flow path member 312 connected to the second flow path member 314 at both ends of the first flow path member 312 in the X direction. In this case, the abutment parts may be formed of an elastic material or the like as described in (2) above or may be formed of a material with low thermal conductivity and a low linear expansion coefficient as described in (3) above.

(4) In the embodiments above, although the size of the first flow path member 312 is set to be larger than the second flow path member 314 only in the X direction and to be almost the same in the Y direction since thermal expansion in the X direction, i.e., the longitudinal direction of the print element substrate 200, is of particular concern, there is not a limitation as such. For example, in a case where thermal expansion in the Y direction is also of concern as thermal expansion in the X direction, the size of the first flow path member 312 is set to be larger than the second flow path member 314 in the X direction and Y direction. Further, the convex parts 502 are installed at both ends in the X direction and both ends in the Y direction formed in the first flow path member 312 to which the second flow path member 314 is connected, and the wall surfaces 1102 of the opening 205*a* are formed as planes with a width in the Y direction. Further, for the registration of the ejection module 404 to the support member 205, the convex parts 502 and the wall surfaces 1002 which face each other in the X direction are abutted and adhered on each other, and the convex parts 502 and the wall surfaces 1102 which face each other in the Y direction are abutted and adhered on each other.

(5) The above-described embodiments and various forms shown in (1) through (4) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-056255, filed August Mar. 30, 2022, which is hereby incorporated by reference herein in its entirety.

What is claimed is:

1. A liquid ejection head comprising:

a module equipped with a substrate capable of ejecting a liquid by driving an ejection energy generation element and a flow path part that is fluidly connected to the substrate;

a support member configured to support the substrate; and a frame configured to support the module and the support member, the frame supporting the support member at an insertion surface of the module that is inserted and engaged, wherein, if the module is inserted and engaged with the frame, the frame and the flow path part face each other via a space in a direction intersecting an inserting direction of the module and abut on each other in the inserting direction so as to be supported, and wherein the frame comprises an opening penetrating in the inserting direction, an area of the opening located upstream with respect to the inserting direction being larger than an area of the opening located downstream with respect to the inserting direction.

2. The liquid ejection head according to claim 1, wherein the flow path part is configured with a plurality of members connected in the inserting direction, and wherein an abutment part of the flow path part that abuts on the frame is formed on a surface positioned on an upstream side with respect to the inserting direction.

3. The liquid ejection head according to claim 2, wherein a portion of the frame that abuts on the flow path part is formed so as to be approximately parallel to the support member supported by the frame.

4. The liquid ejection head according to claim 2, wherein the flow path part is equipped with a first flow path member, which is fluidly connected to the substrate, and a second flow path member, which is fluidly connected to the first flow path member, and wherein the first flow path member is:

formed to be longer than the second flow path member in a predetermined direction intersecting the inserting direction, and equipped with the abutment part in a region formed at both ends in the predetermined direction for being connected to the second flow path member.

5. The liquid ejection head according to claim 2, wherein an adhesive agent for adhering the abutment part and the frame does not easily transmit heat.

6. The liquid ejection head according to claim 2, wherein an adhesive agent for adhering the abutment part and the frame has lower thermal conductivity than that of the flow path part.

7. The liquid ejection head according to claim 2, wherein the abutment part is configured of an elastic material.

8. The liquid ejection head according to claim 2, wherein an adhesive agent for adhering the abutment part and the frame has elasticity.

9. The liquid ejection head according to claim 2, wherein the abutment part is configured of a material with low thermal conductivity and a low linear expansion coefficient.

10. The liquid ejection head according to claim 2, wherein the abutment part is a convex part that protrudes in the inserting direction.

11. The liquid ejection head according to claim 1, wherein the module is equipped with a flexible wiring substrate that transmits electric power and a signal to the substrate.

12. The liquid ejection head according to claim 11, wherein, in the module, the flexible wiring substrate is bent toward a side surface of the flow path part and supported by the frame, the side surface being parallel to a plane formed by a predetermined direction intersecting the inserting direction and the inserting direction.

13. The liquid ejection head according to claim 1, wherein the frame is configured of a material with low thermal conductivity and a low linear expansion coefficient.

14. A liquid ejection apparatus comprising:

a liquid ejection head including:

a module equipped with a substrate capable of ejecting a liquid by driving an ejection energy generation element and a flow path part that is fluidly connected to the substrate;

a support member configured to support the substrate; and a frame configured to support the module and the support member, the frame supporting the support member at an insertion surface of the module that is inserted and engaged, wherein, if the module is inserted and engaged with the frame, the frame and the flow path part face each other via a space in a direction intersecting an inserting direction of the module and abut on each other in the inserting direction so as to be supported, and wherein the frame comprises an opening penetrating in the inserting direction, an area of the opening located upstream with respect to the inserting direction being larger than an area of the opening located downstream with respect to the inserting direction.

15. A liquid ejection head comprising:

a module equipped with a substrate capable of ejecting a liquid by driving an ejection energy generation element and a flow path part that is fluidly connected to the substrate;

a support member configured to support the substrate; and a frame configured to support the module and the support member, the frame supporting the support member at an insertion surface of the module that is inserted and engaged, wherein, if the module is inserted and engaged with the frame, the frame and the flow path part face each other via a space in a direction intersecting an inserting direction of the module and abut on each other in the inserting direction so as to be supported, wherein the flow path part is configured with a plurality of members connected in the inserting direction, and wherein an abutment part of the flow path part that abuts on the frame is formed on a member positioned upstream with respect to the inserting direction.

* * * * *